US012606203B2

(12) United States Patent
Keller et al.

(10) Patent No.: US 12,606,203 B2
(45) Date of Patent: Apr. 21, 2026

(54) IDENTIFYING OCCLUDED AREAS OF ENVIRONMENTS FOR AUTONOMOUS SYSTEMS AND APPLICATIONS

(71) Applicant: NVIDIA Corporation, Santa Clara, CA (US)

(72) Inventors: Christoph Gustav Keller, Baden-Wurttemberg (DE); Cedric De Brito, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 218 days.

(21) Appl. No.: 18/538,338

(22) Filed: Dec. 13, 2023

(65) Prior Publication Data

US 2025/0196882 A1      Jun. 19, 2025

(51) Int. Cl.
B60W 60/00 (2020.01)
G06N 3/08 (2023.01)
G08G 1/16 (2006.01)
*G08G 1/01* (2006.01)

(52) U.S. Cl.
CPC ............. B60W 60/001 (2020.02); G06N 3/08 (2013.01); G08G 1/167 (2013.01); *B60W 2554/4041* (2020.02); *B60W 2554/4044* (2020.02); *G08G 1/0141* (2013.01)

(58) Field of Classification Search
None
See application file for complete search history.

(56) References Cited

U.S. PATENT DOCUMENTS

| | | | |
|---|---|---|---|
| 11,195,533 B2 | 12/2021 | Kumar et al. | |
| 11,537,126 B2 * | 12/2022 | Zheng .................. | G05D 1/0088 |
| 11,625,045 B2 * | 4/2023 | Becker .................. | G01S 13/931 |
| | | | 701/23 |
| 11,820,025 B2 * | 11/2023 | Vu .......................... | G01S 17/87 |
| 11,906,660 B2 | 2/2024 | Wekel et al. | |
| 2014/0347470 A1 * | 11/2014 | Zhang ....................... | B60R 1/28 |
| | | | 382/104 |
| 2019/0064840 A1 * | 2/2019 | Becker ........... | B60W 30/18163 |
| 2020/0363815 A1 | 11/2020 | Mousavian et al. | |
| 2021/0026355 A1 | 1/2021 | Chen et al. | |
| 2021/0260770 A1 * | 8/2021 | Vu .......................... | G01S 17/88 |
| 2021/0342609 A1 | 11/2021 | Smolyanskiy et al. | |
| 2022/0101635 A1 | 3/2022 | Koivisto et al. | |

(Continued)

*Primary Examiner* — Maria S Ayad
(74) *Attorney, Agent, or Firm* — IRON SUMMIT IP LLP

(57)          ABSTRACT

In various examples, identifying occluded areas of environments for autonomous systems and applications is described herein. For instance, systems and methods described herein may process sensor data generated using one or more sensors of a machine to determine one or more areas of an environment that are occluded by at least a part of the machine. In some examples, determining the area(s) of the environment may be based at least on processing the sensor data using one or more machine learning models, processing the sensor data with respect to configuration data, and/or using any other technique. The systems and methods may then determine whether one or more objects are located within the occluded area(s) of the environment. Additionally, the systems and methods may then cause the machine to perform one or more operations based at least on whether the object(s) is located within the occluded area(s).

20 Claims, 17 Drawing Sheets

(56) References Cited

U.S. PATENT DOCUMENTS

| 2022/0261593 | A1  |        | 8/2022 | Yu et al. |
| 2023/0182772 | A1* | 6/2023 | Funke | ............... B60W 60/0015 |
|              |     |        |        | 701/23 |

\* cited by examiner

800

DETERMINE, BASED AT LEAST ON FIRST SENSOR DATA
GENERATED USING A FIRST SENSOR OF A MACHINE, THAT A PART
OF THE MACHINE IS OCCLUDING AN AREA OF THE ENVIRONMENT
B802

DETERMINE, BASED AT
LEAST ON AT LEAST ONE OF THE FIRST SENSOR
DATA OR SECOND SENSOR DATA GENERATED USING A SECOND
SENSOR OF THE MACHINE, WHETHER AN OBJECT MAY BE LOCATED
WITHIN THE AREA OF THE ENVIRONMENT
B804

YES

No

CAUSE THE MACHINE TO
PERFORM ONE OR MORE FIRST
OPERATIONS
B806

CAUSE THE MACHINE TO
PERFORM ONE OR MORE
SECOND OPERATIONS
B808

FIGURE 8

900
DETERMINE ONE OR MORE TRAJECTORIES FOR NAVIGATING A MACHINE FROM A FIRST LOCATION TO A SECOND LOCATION
B902
DETERMINE ONE OR MORE OCCLUDED AREAS ASSOCIATED WITH THE ONE OR MORE TRAJECTORIES
B904
SELECT, BASED AT LEAST ON THE ONE OR MORE OCCLUDED AREAS, A TRAJECTORY FROM THE ONE OR MORE TRAJECTORIES
B906
FIGURE 9

1000

DETERMINE, BASED AT LEAST ON A PART BEING IN A FIRST POSE, WHETHER AN OBJECT IS LOCATED IN AN OCCLUDED AREA CAUSED BY THE PART
B1002

CAUSE THE PART TO MOVE FROM THE FIRST POSE TO A SECOND POSE IN ORDER TO REDUCE THE OCCLUDED AREA
B1004

VERIFY WHETHER THE OBJECT IS LOCATED WITHIN THE OCCLUDED AREA BASED AT LEAST ON THE PART BEING IN THE SECOND POSE
B1006

1176

SERVER(S) 1178

CPU 1180(B)

CPU 1180(A)

PCIE SWITCH 1182(D)

PCIE SWITCH 1182(C)

PCIE SWITCH 1182(B)

PCIE SWITCH 1182(A)

1186

GPU 1184(F)

GPU 1184(H)

GPU 1184(E)

GPU 1184(G)

GPU 1184(B)

GPU 1184(D)

GPU 1184(A)

GPU 1184(C)

1188

1100

1194

1192

NETWORK(S) 1190

1200

MEMORY
1204

I/O COMPONENTS
1214

CPU(s)
1206

POWER SUPPLY
1216

GPU(s)
1208

PRESENTATION
COMPONENT(S)
1218

COMM. INTERFACE
1210

LOGIC UNIT(S)
1220

I/O PORT(S)
1212

1202

1300

IDENTIFYING OCCLUDED AREAS OF ENVIRONMENTS FOR AUTONOMOUS SYSTEMS AND APPLICATIONS

BACKGROUND

Vehicles, such as semi-autonomous vehicles and/or autonomous vehicles, need to detect the locations of objects within an environment in order to safely navigate. For example, a vehicle may need to know the locations of other vehicles and/or pedestrians in order to avoid collisions with the other vehicles and/or pedestrians when navigating. In order to determine the locations of objects, vehicles may use sensors that are located at various positions on the vehicles, such as front-facing sensors, rear-facing sensors, side-facing sensors, and/or the like. However, in some circumstances, one or more sensors of a vehicle may be obstructed, such as by a part of the vehicle. For example, if the vehicle includes a truck, at least a portion of a sensor of the truck may be obstructed by a wheel when the truck is turning. As such, when sensors of vehicles are obstructed, it may be difficult for the vehicles to determine whether objects are located at specific occluded areas surrounding the vehicles.

SUMMARY

Embodiments of the present disclosure relate to identifying occluded areas of environments for autonomous systems and applications. For instance, systems and methods described herein may process sensor data generated using one or more sensors of a machine to determine one or more areas of an environment that are occluded by at least a part of the machine. In some examples, determining the area(s) of the environment may be based at least on processing the sensor data using one or more machine learning models, processing the sensor data with respect to configuration data (e.g., a table) associated with the machine, and/or using any other technique. The systems and methods may then determine whether one or more objects are located within and/or are likely located within the occluded area(s) of the environment. In some examples, determining whether the object(s) is located within and/or likely located within the occluded area(s) may be based on processing at least a portion of the sensor data to determine information associated with the object(s), such as one or more poses and/or one or more directions of travel associated with the object(s), and then using the information to determine whether the object(s) is located within and/or likely located within the occluded area(s). The systems and methods may then cause the machine to perform one or more operations based at least on whether the object(s) is located within and/or likely located within the occluded area(s).

In contrast to conventional systems, such as those described above, the current systems, in some embodiments, are able to determine which areas of the environment are occluded based at least on a part of a machine obstructing one or more sensors and/or determine whether one or more objects are located within the occluded area(s). This may improve the overall safety and/or performance of the current systems as compared to the conventional systems. For instance, and as described in more detail herein, by determining the occlude area(s) of the environment that is around a machine, the current systems may cause one or more operations associated with the machine to be performed, such as determining a new trajectory for the machine or moving a part of the machine that is causing the occlusion, in order to increase the visibility of the environment around the machine. Additionally, by determining whether an object(s) is located within an occluded area(s), the current systems may determine operations for navigating the machine such that the machine avoids colliding the with object(s).

BRIEF DESCRIPTION OF THE DRAWINGS

The present systems and methods for identifying occluded areas of environments for autonomous systems and applications are described in detail below with reference to the attached drawing figures, wherein:

FIG. 8 illustrates a flow diagram showing a method for determining whether one or more objects are located within an occluded area associated with a machine, in accordance with some embodiments of the present disclosure;

FIG. 9 illustrates a flow diagram showing a method for determining a trajectory for a machine based at least on an occluded area of an environment, in accordance with some embodiments of the present disclosure;

DETAILED DESCRIPTION

Figure 1:
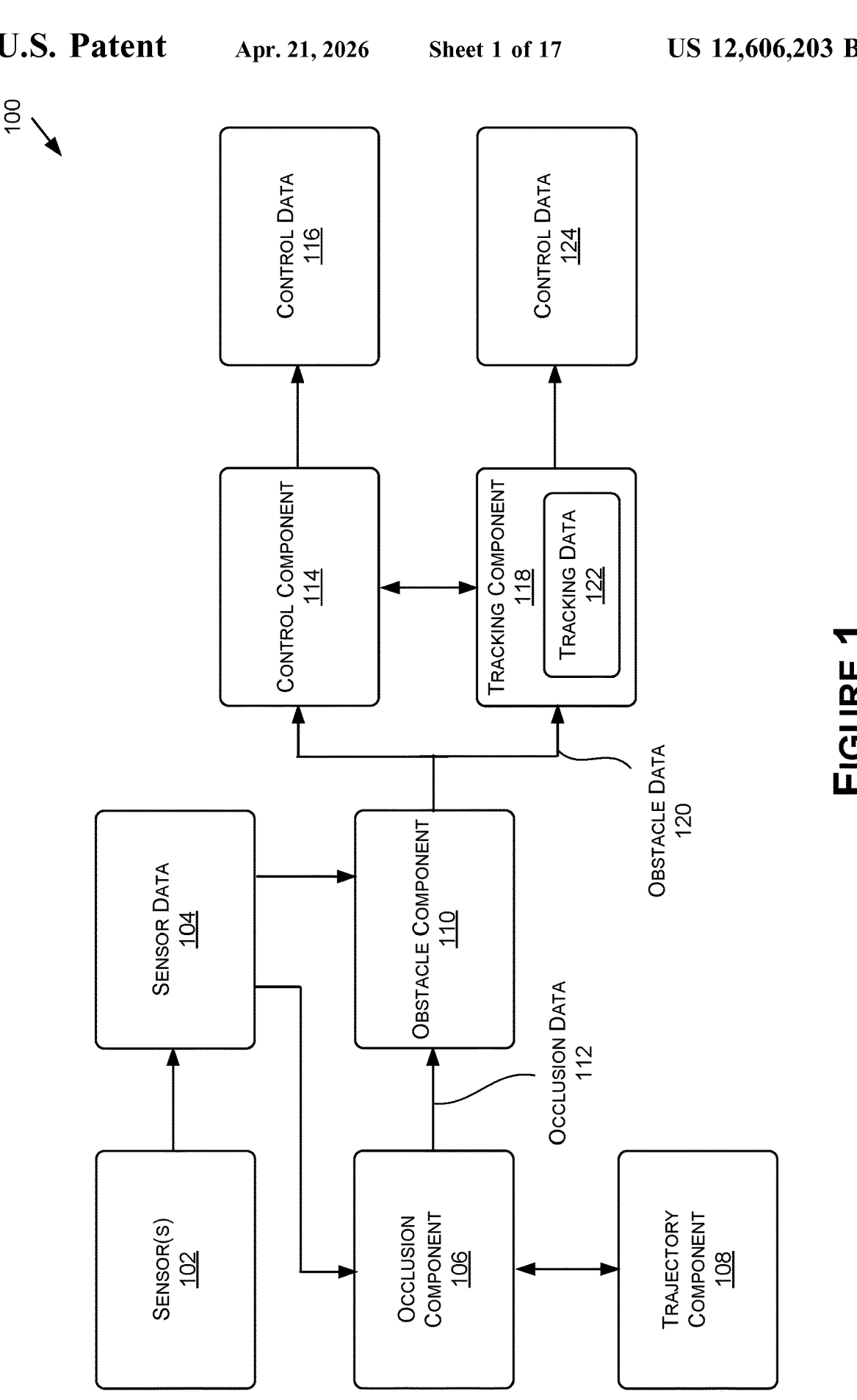
FIG. 1 illustrates an example data flow diagram for a process of identifying areas of an environments that are occluded based at least on parts of machines obstructing sensors, in accordance with some embodiments of the present disclosure.

Systems and methods are disclosed related to identifying occluded areas of environments for autonomous systems and applications. Although the present disclosure may be described with respect to an example autonomous or semi-autonomous vehicle or machine 1100 (alternatively referred to herein as "vehicle 1100," "ego-vehicle 1100," "ego-machine 1100," or "machine 1100," an example of which is described with respect to FIGS. 11A-11D), this is not intended to be limiting. For example, the systems and methods described herein may be used by, without limitation, non-autonomous vehicles or machines, semi-autonomous vehicles or machines (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to occluded area detection, this is not intended to be limiting, and the systems and methods described herein may be used in augmented reality, virtual reality, mixed reality, robotics, security and surveillance, autonomous or semi-autonomous machine applications, and/or any other technology spaces where object detection and/or map creation may be used.

For instance, a system(s) may receive sensor data generated using one or more sensors of a machine. As described herein, the sensor data may include, but is not limited to, image data generated using one or more image sensors (e.g., one or more cameras), LiDAR data generated using one or more LiDAR sensors, RADAR data generated using one or more RADAR sensors, pose data generated using one or more pose sensors (e.g., one or more location sensors, one or more orientation sensors, etc.), motion data generated using one or more motion sensors, and/or any other type of sensor data generated using any other type of sensor. The system(s) may then use the sensor data to cause the machine to navigate within an environment. For instance, the system(s) may process the sensor data to determine information associated with objects that are located within the environment, such as the poses (e.g., locations, orientations, etc.) of the objects, the directions of travel of the objects, the velocities of the objects, the accelerations of the objects, the classifications of the objects, and/or any other information. As described herein, an object may include, but is not limited to, a vehicle, a machine, a pedestrian, an animal, a curb, a traffic sign, a traffic light, and/or any other type of object that may be located within the environment. The system(s) may then use the information associated with the objects to determine one or more trajectories for the machine to navigate, such as to avoid colliding with the objects.

However, as described herein, in some examples, the machine may include one or more parts that are capable of moving and, in some poses, obstructing at least a sensor of the machine such that an area of the environment around the machine is occluded. For a first example, if the machine includes a truck, then one or more wheels of the truck may at least partially obstruct a sensor of the truck such as when the wheel(s) is turned and/or at least partially protruding from a cabin of the truck. For a second example, if the machine includes a tractor, then an arm of the tractor may at least partially obstruct a sensor of the tractor when the arm is oriented in a specific orientation with respect to the tractor. While these are just a few examples of parts of machines that may obstruct sensors, in other examples, other parts of any type of machine may obstruct sensors of the machine.

As such, the system(s) may perform one or more techniques in order to determine that at least an area of the environment is occluded by a part of the machine. For instance, in some examples, the system(s) may process at least a portion of the sensor data using one or more machine learning models that are trained to determine areas of the environment that are occluded. For example, the machine learning model(s) may determine that a portion of a sensor representation (e.g., an image) represented by the sensor data corresponds to (e.g., depicts) the part of the machine and then determine the area of the environment that is occluded based at least on the portion of the sensor representation, which is described in more detail herein. Additionally, or alternatively, in some examples, the system(s) process sensor data generated using a sensor associated with the part, where the sensor data represents a current pose (e.g., location, orientation, etc.) associated with the part. The system(s) may then determine the area of the environment based at least on the current pose, such as by using a table and/or other type of data, which is described in more detail herein. While these are just two example techniques for how the system(s) may use the sensor data to determine the area of the environment that is occluded by the part, in other examples, the system(s) may use additional and/or alternative techniques.

In some examples, the system(s) may then determine one or more operations in order to reduce the occluded area of the environment. For a first example, such as if the machine is navigating from a first location (e.g., a current location) to a second location (e.g., a destination location), the system(s) may determine multiple trajectories for navigating the machine to the second location. The system(s) may then determine one of the trajectories that is associated with the minimum obstructed area (e.g., the trajectory that causes the part of the machine to be in a pose that minimizes the obstruction of the sensor) and cause the machine to navigate according that trajectory. For a second example, such as if the machine is moving a part (e.g., an arm) from a first pose to a second pose, the system(s) may determine multiple paths of motion for moving the part. The system(s) may then determine one of the paths that is associated with the minimum obstructed area and cause the part to move along that path. While these are just a few operations that the system(s) may use to reduce the occluded area, in other examples, the system(s) may use additional and/or alternative operations.

Additionally, the system(s) may determine whether one or more objects are located within the occluded area of the environment. For instance, the system(s) may process at least a portion of the sensor data and, based at least on the processing, determine information associated with one or more objects located within the environment. The system(s) may then use the information to determine whether the object(s) is located within and/or is likely located within the occluded area of the environment. For a first example, and for an object, the system(s) may use the location, velocity, and/or direction of travel associated with the object to determine whether the object likely navigated into the occluded area of the environment. For a second examples, and for an object, the system(s) may determine a location of the object when a part of the machine is in a first pose at a first time. The system(s) may then determine the occluded area of the environment based at least on the part of the machine moving to a second pose at a second time. Additionally, the system(s) may determine whether the location of the object is now located within the occluded area. While these are just a few example techniques of how the system(s) may determine whether an object is located in an occluded area, in other examples, the system(s) may use additional and/or alternative techniques.

If the system(s) determines that an object(s) is located within and/or likely located within the occluded area, then the system(s) may cause the machine to perform one or more operations, such as navigating along a new trajectory or stopping, such that the machine does not collide with the object(s). Additionally, the system(s) may track the object(s) in order to determine when the object(s) is no longer located within the occluded area. For a first example, the system(s) may continue to receive sensor data generated using one or more of the sensor(s). The system(s) may then use the sensor data to determine when the object(s) is located outside of the occluded area, such as based on a new location(s) of the object(s) being located outside of the occluded area. For a second example, the system(s) may cause the part of the machine that is causing the occlusion to move from a current pose to a new pose (e.g., if it is safe) such that at least a portion of the occluded area is no longer occluded. The system(s) may then again use the sensor data to determine whether the object(s) is still located within the area that was previously occluded by the part. While these are just a few example techniques of how the system(s) may determine whether the object(s) is still located within the occluded area, in other examples, the system(s) may use additional and/or alternative techniques.

In some examples, the system(s) may then cause the machine to perform one or more operations based at least on the object(s) no longer being located within the occluded area. For example, if the machine was originally going to navigate along a trajectory that included at least a portion of the occluded area, then the system(s) may cause the machine to once again continue along the trajectory. As such, by performing such processes, the system(s) may increase the safety of the machine and/or the objects located within the environment.

The systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems implementing large language models (LLMs), systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems for performing generative AI operations, systems implemented at least partially using cloud computing resources, and/or other types of systems.

With reference to FIG. 1, FIG. 1 illustrates an example data flow diagram for a process 100 of identifying areas of an environments that are occluded based at least on parts of machines obstructing sensors, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 1100 of FIGS. 11A-11D, example computing device 1200 of FIG. 12, and/or example data center 1300 of FIG. 13.

The process 100 may include one or more sensors 102 associated with a machine (e.g., the vehicle 1100) generating sensor data 104. As described herein, the sensor data 104 may include image data generated using one or more image sensors (e.g., one or more cameras), LiDAR data generated using one or more LiDAR sensors, RADAR data generated using one or more RADAR sensors, pose data generated using one or more pose sensors (e.g., one or more location sensors, one or more orientation sensors, etc.), motion data generated using one or more motion sensors, and/or any other type of sensor data generated using any other type of sensor. In some examples, one or more of the sensor(s) 102 may be associated with determining information associated with an environment surrounding the machine, such as information associated with objects. For example, a sensor 102 may include a forward-facing sensor, a side-facing sensor, a rear-facing sensor, and/or the like associated with the machine. In some examples, one or more of the sensor(s) 102 may be associated with determining information associated with one or more parts of the machine. For example, sensor data 104 generated using a sensor 102 associated with a part of the machine may be used to determine a pose associated with the part. As described herein, a pose may include, but is not limited to, a location (e.g., the x-coordinate location, the y-coordinate location, the z-coordinate location, etc.), an orientation (e.g., a roll, a pitch, a yaw, etc.), and/or any other information associated with the part.

The process 100 may include an occlusion component 106 processing at least a portion of the sensor data 104 and, based at least on the processing, determining one or more areas of the environment that are occluded. For instance, and as described herein, the machine may use a sensor 102 to determine information associated with a portion of the environment, such as the portion of the environment that is corresponds to a field-of-view (FOV) associated with the sensor 102. In some examples, the information may be associated with objects located within the portion of the environment, such as the poses (e.g., locations, orientations, etc.) of the objects, the directions of travel of the objects, the velocities of the objects, the accelerations of the objects, the classifications of the objects, and/or any other information. As described herein, a location of an object may include, but is not limited to, a two-dimensional location (e.g., the x-coordinate location and the y-coordinate location), a three-dimensional location (e.g., the x-coordinate location, the y-coordinate location, and the z-coordinate location), a distance and/or direction with respect to the machine, and/or any other type of location. Additionally, a classification associated with an object may include, but is not limited to, a vehicle, a machine, a pedestrian, an animal, a curb, a traffic sign, a traffic light, and/or any other type of object classification.

In some examples, at least a portion of the sensor 102 may become obstructed by a part of the machine, such as when the part of the machine includes one or more poses. For a first example, if the machine includes a truck, then one or more wheels of the truck may at least partially obstruct a sensor 102 of the truck such as when the wheel(s) is turned and/or at least partially protruding from a cabin of the truck. For a second example, if the machine includes a tractor, then an arm of the tractor may at least partially obstruct a sensor 102 of the tractor when the arm is oriented in a specific orientation with respect to the tractor. As such, when a portion of the sensor 102 is obstructed by a part of the machine, then an area of the environment that is at least partially located within the portion of the environment (e.g., the FOV) associated with the sensor 102 may become occluded.

Figure 2A:
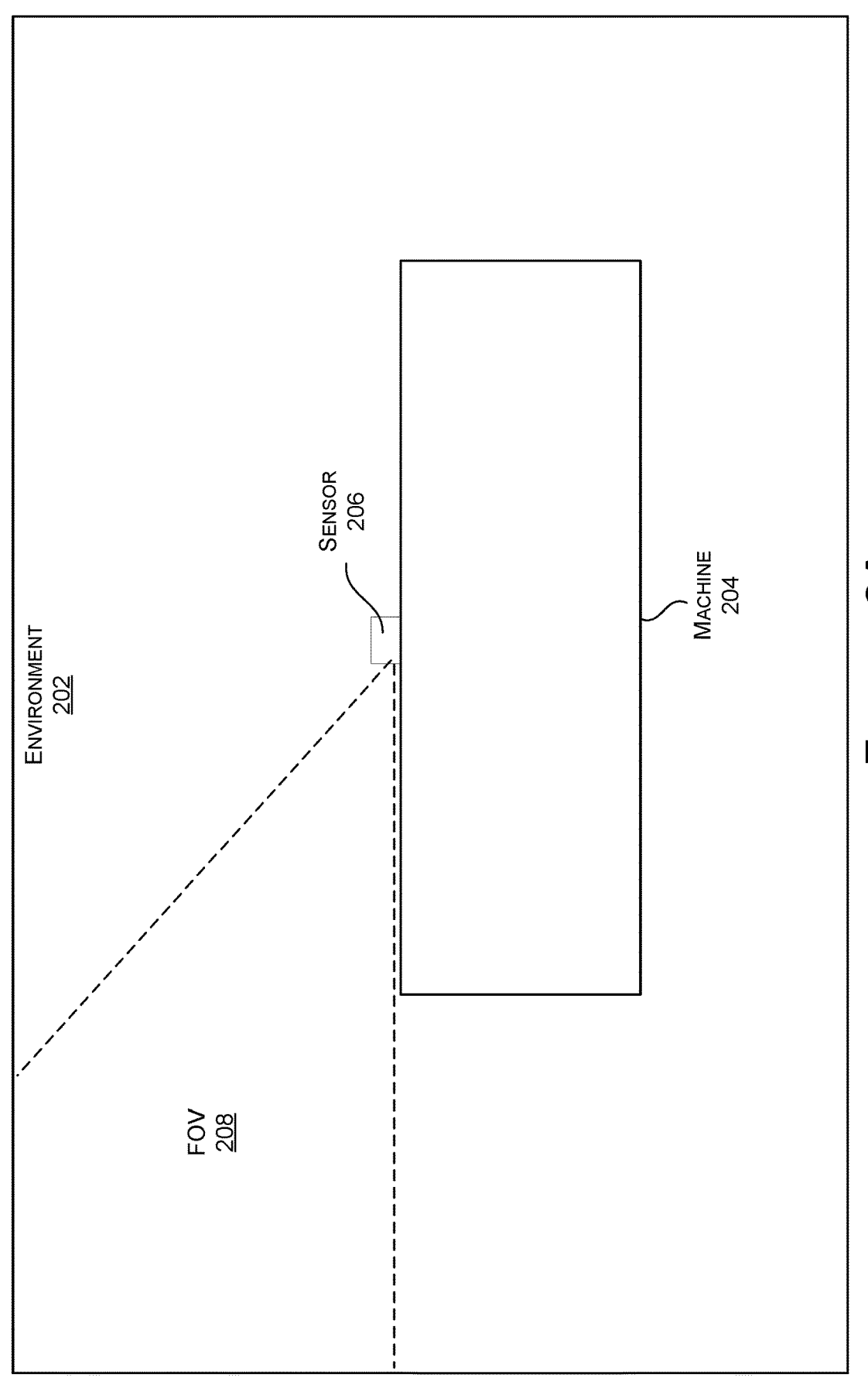
FIGS. 2A-2B illustrate an example of an area of an environment being obstructed by a part of a machine, in accordance with some embodiments of the present disclosure.
Figure 2B:
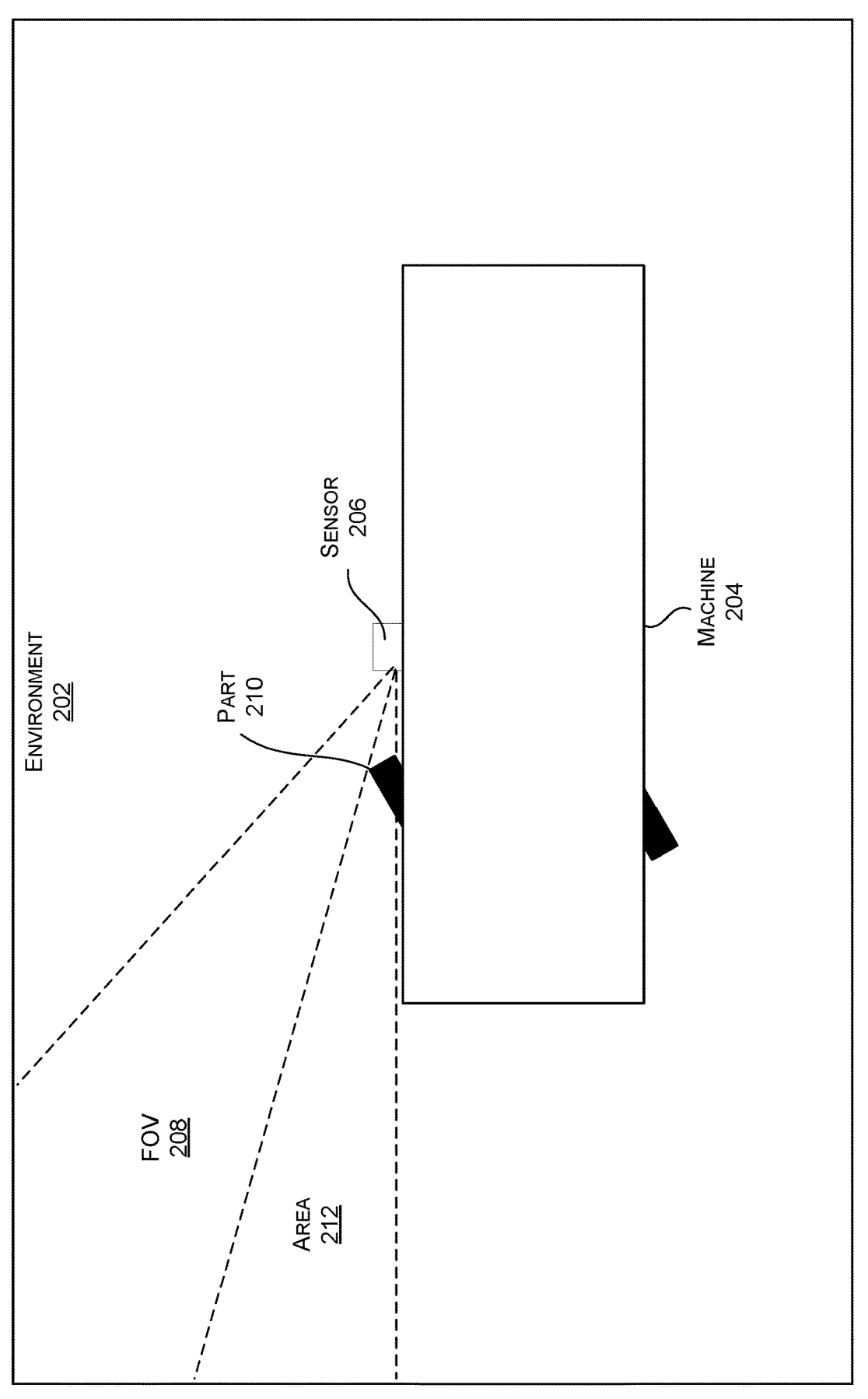

For instance, FIGS. 2A-2B illustrate an example of an area of an environment 202 being obstructed by a part of a machine 204, in accordance with some embodiments of the present disclosure. As shown by the example of FIG. 2A, the machine 204 may include a sensor 206 (which may include, and/or represent, one of the sensor(s) 102) that has a FOV 208 corresponding to at least a portion of the environment 202. The machine 204 may then use sensor data (e.g., the sensor data 104) generated using the sensor 206 to perform one or more operations. For example, the machine 204 may use the sensor data to determine information associated with objects that are located within the portion of the environment 202 that is associated with the FOV 208. In the example of FIG. 2A, the sensor 206 is not obstructed such that an entirety of the portion of the environment 202 that is associated with the FOV 208 is not occluded.

Next, and as illustrated by the example of FIG. 2B, a part 210 of the machine 204 may change pose such that the part 210 obstructs at least a portion of the FOV 208 of the sensor 206. For instance, the part 210 may include a wheel of the machine 204, where the wheel changes orientation in order to turn the machine 204. As such, based at least on the portion of the FOV 208 being obstructed, an area 212 of the environment 202 that was previously visible using the sensor 206 is now occluded. In some examples, and as described in more detail herein, the area 212 that is occluded because of the part 210 may decrease or increase based at least on the pose (e.g., the orientation) of the part 210.

Referring back to the example of FIG. 1, the occlusion component 106 may use one or more techniques in order to determine the area of the environment that is occluded. For instance, in some examples, the occlusion component 106 may include and/or use one or more machine learning models that are trained to determine a portion of a sensor representation represented by the sensor data 104 that corresponds to the part. For example, if the sensor data 104 is image data and the sensor representation is an image, then the machine learning model(s) may be trained to determine a portion of the image that depicts the part. The occlusion component 106 may then determine the area of the environment based at least on the portion of the sensor representation. For a first example, the occlusion component 106 may use data that relates portions of sensor representations to occluded areas of environments. For a second example, the machine learning model(s) may be trained to further output occluded areas of environments based at least on portions of sensor representations being occluded.

Figure 3:
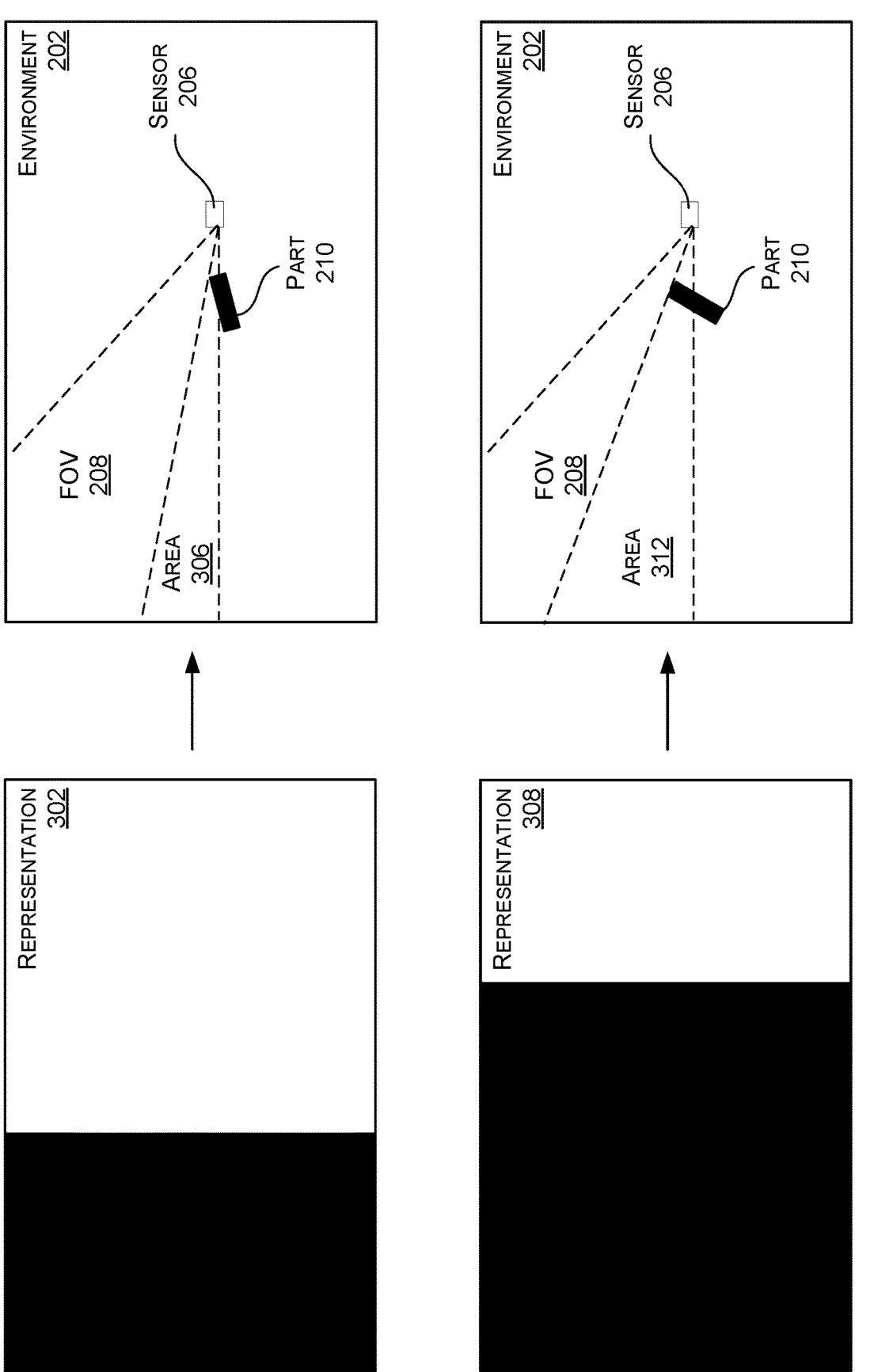
FIG. 3 illustrates an example of determining an area of an environment that is occluded based at least on processing sensor data generated using a sensor, in accordance with some embodiments of the present disclosure.

For instance, FIG. 3 illustrates an example of determining an area of an environment that is occluded based at least on processing sensor data generated using a sensor, in accordance with some embodiments of the present disclosure. As shown by the top illustrations, the occlusion component 106 may determine that a portion of a sensor representation 302 (e.g., an image) corresponds to (e.g., depicts) the part 210 of the machine 204, which is indicated by obstruction 304. Based at least on that determination, the occlusion component 106 may determine that a first area 306 of the environment 202 is occluded. Next, and as shown by the bottom illustrations, the occlusion component 106 may determine that a portion of a sensor representation (e.g., another image) 308 corresponds to (e.g., depicts) the part 210 of the machine, which is indicated by obstruction 312. Based at least on that determination, the occlusion component 106 may determine that a second area of the environment 202 is occluded.

As such, the example of FIG. 3 illustrates that the occluded area of the environment 202 may change based at least on the pose associated with the part 210 of the machine 204. In some examples, the machine learning model(s) may be trained to determine the occluded area based at least on the portion of the sensor representation that corresponds to the part 210. Additionally, or alternatively, in some examples, the occlusion component 106 may determine the occluded area based at least on the portion of the sensor representation that corresponds to the part 210, such as by using a table and/or any other type of data that associates obstructed portions of sensor representations with occluded areas of the environment 202.

While the example of FIG. 3 is described with respect to the sensor representations 302 and 308 including images, in other examples, the sensor representations 302 and 308 may include any other type of information represented by any other type of sensor data. For example, if the sensor 206 includes a LiDAR sensor and the sensor data includes LiDAR data, then a sensor representation may include points located within the environment, such as determined based at least on one or more spins of the LiDAR sensor.

Additionally, the occlusion component 106 may determine an obstructed portion of the sensor representation based on the distances associated with the points. For example, points that are associated with distances that are less than a threshold distance may be associated with the part of the machine since the points are reflecting off the part when the sensor is occluded. As such, the occlusion component 106 (e.g., the machine learning model(s)) may determine the obstructed portion of the sensor representation based at least on the portion of the points. The occlusion component 106 may then again determine the occluded area based at least on the obstructed portion of the sensor representation.

Referring back to the example of FIG. 1, in some examples, the occlusion component 106 may process the sensor data 104 generated using the sensor 102 that is associated with the part of the machine to determine the area of environment that is occluded. For instance, and as described herein, the sensor data 104 may indicate the current pose associated with the part, such as the location and/or orientation associated with the part. As such, the occlusion component 106 may use the current pose to determine the occluded area. For example, the occlusion component 106 may store data, such as a table, that associates various poses of the part with different occlusion areas. As such, the occlusion component 106 may compare the current pose of the part to the various poses in order to identify a similar pose. The occlusion component 106 may then use the determined similar pose to determine the occluded area, such as the occluded area that is associated with the determined similar pose.

Figure 4:
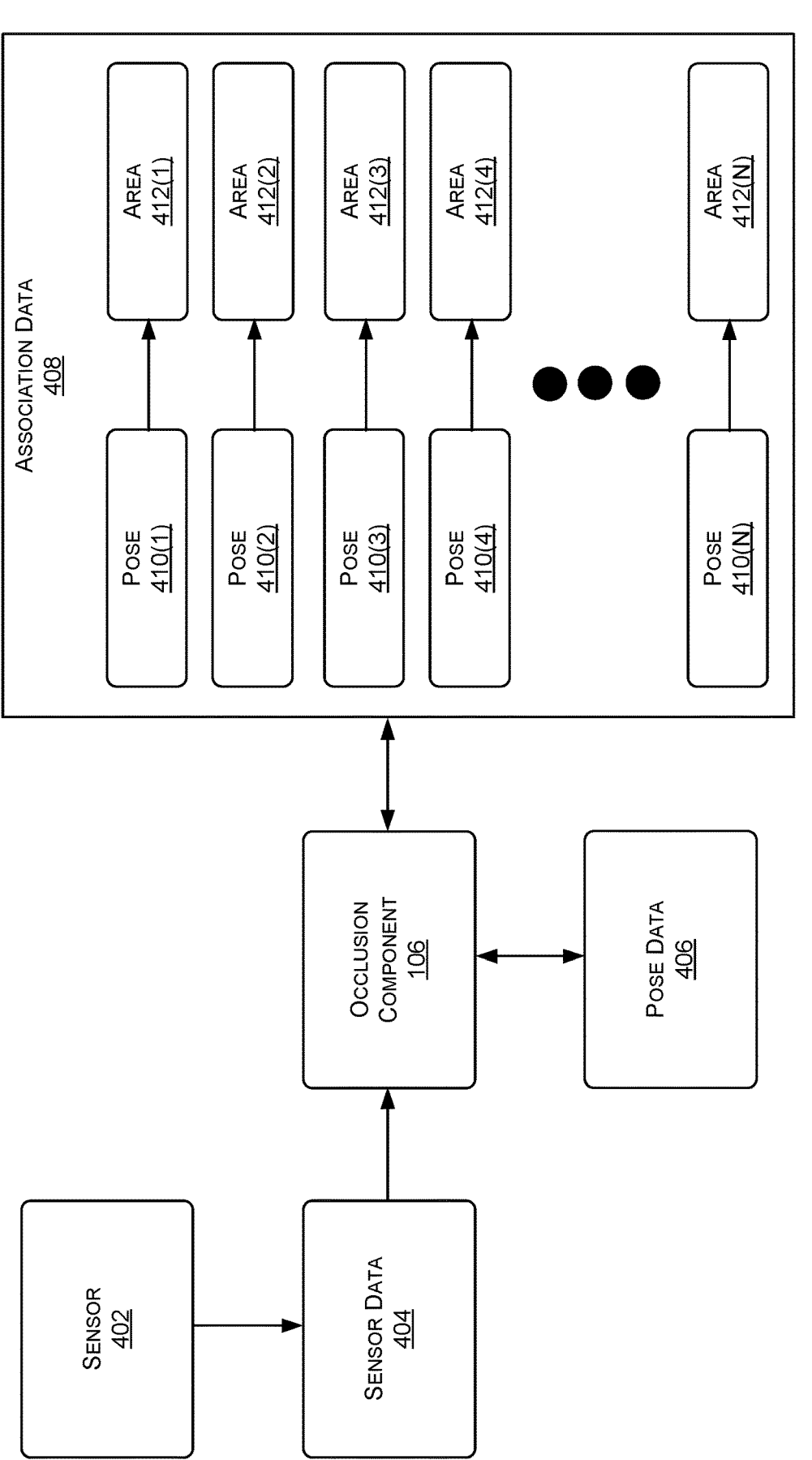
FIG. 4 illustrates an example of using a sensor associated with a part of a machine to determine an occluded area of an environment that is caused by the part, in accordance with some embodiments of the present disclosure.

For instance, FIG. 4 illustrates an example of using a sensor 402 (which may represent, and/or include, one of the sensor(s) 102) associated with the part 210 of the machine 204 to determine an occluded area of the environment 202 that is caused by the part, in accordance with some embodiments of the present disclosure. As shown, the occlusion component 106 may receive sensor data 404 (which may represent, and/or include, at least a portion of the sensor data 104) from the sensor 402. The occlusion component 106 may then use the sensor data 404 to determine a current pose associated with the part 210, wherein the current pose may be represented by pose data 406. As described herein, the current pose may indicate at least the current location and/or current orientation associated with the part 210. The occlusion component 106 may then use the current pose and association data 408 to determine the occluded area of the environment 202.

For instance, the association data 408, which may represent a table, may associate various poses 410(1)-(N) (also referred to singularly as "pose 410" or in plural as "poses 410") with different occluded areas 412 (also referred to singularly as "occluded area 412" or in plural as "occluded areas 412"). As such, the occlusion component 106 may determine that the current pose corresponds to one of the poses 410 from the association data 408. In some examples, the occlusion component 106 may make the determination based at least on the current pose matching and/or being within one or more thresholds to the pose 410. The occlusion component 106 may then use the association data 408 to determine that the identified pose 410 is associated with one of the occluded areas 412. As such, the occlusion component 106 may determine the area of the environment 202 that is occluded based at least on the occluded area 410 with respect to the machine 204.

Referring back to the example of FIG. 1, while these are just a few example techniques for how the occlusion component 106 may determine the occluded area of the environment, in other examples, the occlusion component 106 may use additional and/or alternative techniques.

As further illustrated in the example of FIG. 1, the process 100 may include a trajectory component 108 that is configured to determine a trajectory for the machine to navigate that reduces and/or minimizes the occluded area. For example, the machine may be located at a first location (e.g., a current location) and attempting to navigate to a second location (e.g., a destination location). As such, the trajectory component 108 may determine one or more trajectories associated with navigating the machine from the first location to the second location. In some examples, a respective trajectory may cause the part of the machine that causes the occlusion to obscure a respective area of the environment around the machine. As such, the occlusion component 106 may perform one or more of the processes described herein to determine one or more occluded areas of the environment for the one or more trajectories.

The trajectory component 108 may then select a trajectory based at least on the occluded area(s). For instance, in some examples, the trajectory component 108 may select the trajectory that is associated with the minimum occluded area within the environment. However, in some examples, the trajectory component 108 may use other factors when selecting a trajectory, such as one or more distances traveled for the one or more trajectories, one or more times it will take to travel the one or more trajectories, one or more locations of one or more objects within the environment, and/or any other factor.

Figure 5:
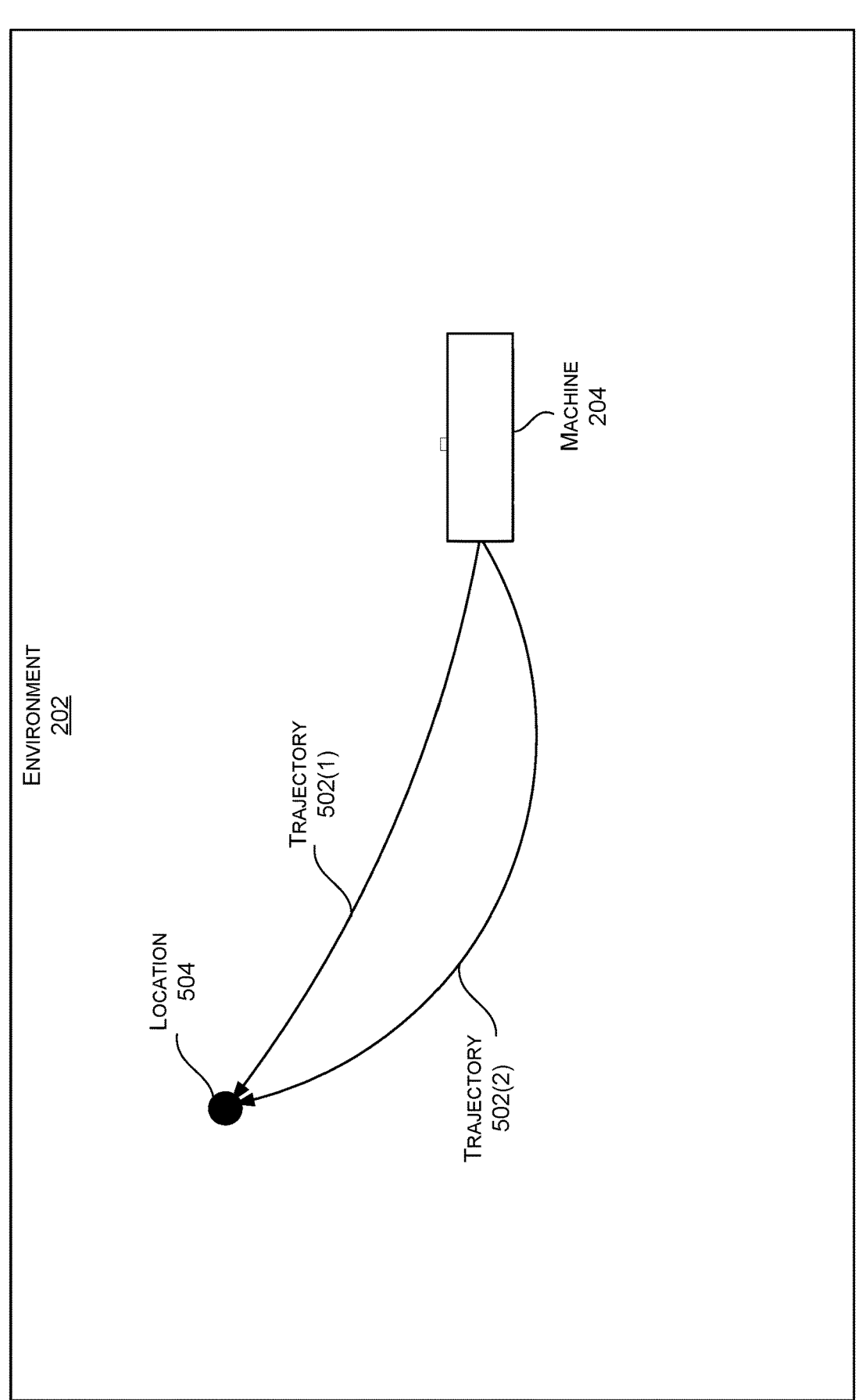
FIG. 5 illustrates an example of selecting a trajectory for a machine based at least on an occluded area, in accordance with some embodiments of the present disclosure.

For instance, FIG. 5 illustrates an example of selecting a trajectory for the machine 204 based at least on an occluded area, in accordance with some embodiments of the present disclosure. As shown, the trajectory component 108 may determine that the machine 204 is able to navigate at least a first trajectory 502(1) and a second trajectory 502(2) to get from a current location to a destination location 504. As such, the occlusion component 106 may determine a first occluded area (e.g., the occluded area 306) associated with the first trajectory 502(1) and a second occluded area (e.g., the occluded area 312) associated with a second trajectory 502(2). The trajectory component 108 may then select one of the trajectories 502(1)-(2) based at least on the first occluded area and the second occluded area. For instance, and in the example of FIG. 5, the trajectory component 108 may select the first trajectory 502(1) based at least on the first occluded area being less than the second occluded area.

Referring back to the example of FIG. 1, the process 100 may include an obstacle component 110 receiving at least occlusion data 112 from the occlusion component 106 and/or sensor data 104 generated using the sensor(s) 102. As described herein, in some examples, the occlusion data 112 may represent the occluded area(s) of the environment as determined using the occlusion component 106. Additionally, the sensor data 104 received by the obstacle component 110 may include the same sensor data 104 received by the occlusion component 106 and/or at least a portion of the sensor data 104 received by the obstacle component 110 may be different than at least a portion of the sensor data 104 received by the occlusion component 106.

The process 100 may then include the obstacle component 110 processing at least a portion of the sensor data 104 to determine information associated with objects located within the environment. As described herein, the information may include, but is not limited to, poses (e.g., locations, orientations, etc.) of the objects, the directions of travel of the objects, the velocities of the objects, the accelerations of the objects, the classifications of the objects, and/or any other information. In some examples, the obstacle component 110 may include and/or use one or more machine learning models, neural networks, algorithms, and/or any other component that is configured and/or trained to process the at least the portion of the sensor data 104 in order to determine the information associated with the objects. For example, the obstacle component 110 may include a perception system associated with the machine.

The process 100 may then include the obstacle component 110 determining whether one or more objects are entering an occluded area associated with the machine and/or are already located within the occluded area associated with the machine. For example, and for an object, the obstacle component 110 may determine that, based at least on a pose (e.g., a location) and a direction of travel associated with the object, the object is entering the occluded area of the environment and/or is likely to enter the occluded area of the environment. For instance, if the location associated with the object is proximate to the occluded area, such as within a threshold distance (e.g., 0.5 meters, 1 meter, 2 meters, etc., and the direction of travel is towards the occluded area, then the obstacle component 110 may determine that the object entered the occluded area when the obstacle component 110 no longer detects the object using the sensor data 104.

In some examples, the occlusion component 106 may use additional information associated with the object when determining that the object is entering the occluded area. For instance, if a classification associated with object includes a class of object that is likely to enter the occluded area, then the obstacle component 110 may determine that the object is entering the occluded area. For example, if the classification associated with the object includes mechanic, then the obstacle component 110 may determine that the object is entering the occluded area, such as to work on the machine.

Figure 6:
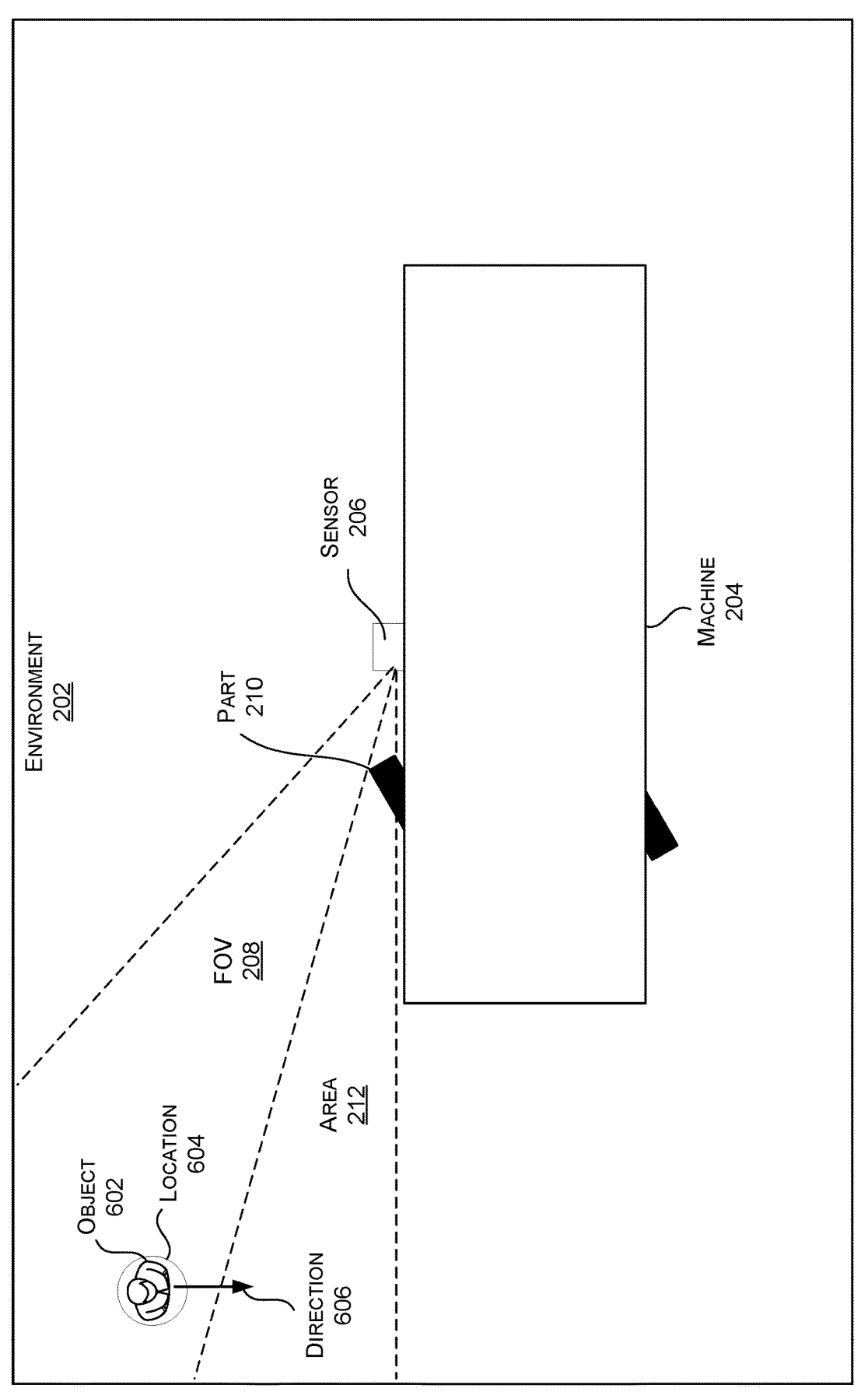
FIG. 6 illustrates an example of determining when an object is entering an occluded area associated with a machine, in accordance with some embodiments of the present disclosure.

For instance, FIG. 6 illustrates an example of determining when an object 602 (e.g., a pedestrian) is entering the occluded area 212 associated with the machine 204, in accordance with some embodiments of the present disclosure. In the example of FIG. 6, the obstacle component 110 may determine at least a location 604 and a direction of travel 606 associated with the object 602. In some examples, the obstacle component 110 determines the location 604 and/or the direction of travel 606 using the sensor data generated using the sensor 206. In some examples, the obstacle component 110 determines the location 604 and/or the direction of travel 606 using sensor data generated using one or more additional sensors of the machine 204. The obstacle component 110 may then use the location 604 and the direction of travel 604 to determine that the obstacle is entering the occluded area 212. For example, the obstacle component 110 may determine that, based on the location 604 and the angle associated with the direction of travel 606, the object will be located within the occluded area 212. In some examples, the obstacle component 110 may then verify that the object 602 is likely located within the occluded area 212, such as based on the sensor data no longer representing the object 602 (e.g., the object 602 no longer being visible to the machine 204 using the sensor(s).

Referring back to the example of FIG. 1, the process 100 may include the obstacle component 110 using other techniques to determine that one or more objects are already located within the occluded area. For instance, and for an object, the obstacle component 110 may determine a location associated with the object based at least on the pose. The obstacle component 110 may then receive occlusion data 112 indicating a new occluded area of the environment, such as if the part associated with the machine has changed poses.

As such, the occlusion component 106 may determine that the object now located within the new occluded area based at least on the location associated with the object being within the new occluded area. For instance, and referring to the examples of FIG. 2A-2B, the obstacle component 110 may initially determine that a location associated with an object is within the FOV 208 at a first time associated with FIG. 2A. Next, the obstacle component 110 may determine that the location associated with the object is within the occluded area 212 at a second time associated with FIG. 2B. As such, the occlusion component 106 may determine that the object is located within the occluded area 212.

The process 100 may also include the obstacle component 110 determining when one or more objects exit the occluded area. For instance, in some examples, and for an object, the obstacle component 110 may determine that the object exited the occluded area based at least on determining that the object moved from a location that is within the occluded area to a location that is outside of the occluded area. Additionally, or alternatively, in some examples, and for an object, the obstacle component 110 may determine that the object exited the occluded area based at least on newly detecting the object within the environment and/or proximate to the occluded area. For example, if the obstacle component 110 tracks objects within the environment, such as when the obstacle component 110 continues to receive new sensor data 104 from the sensor(s) 102, then the obstacle component 110 may determine that the object exited the occluded area based at least on the object including a new object for which the obstacle component 110 is not currently tracking.

Figure 7:
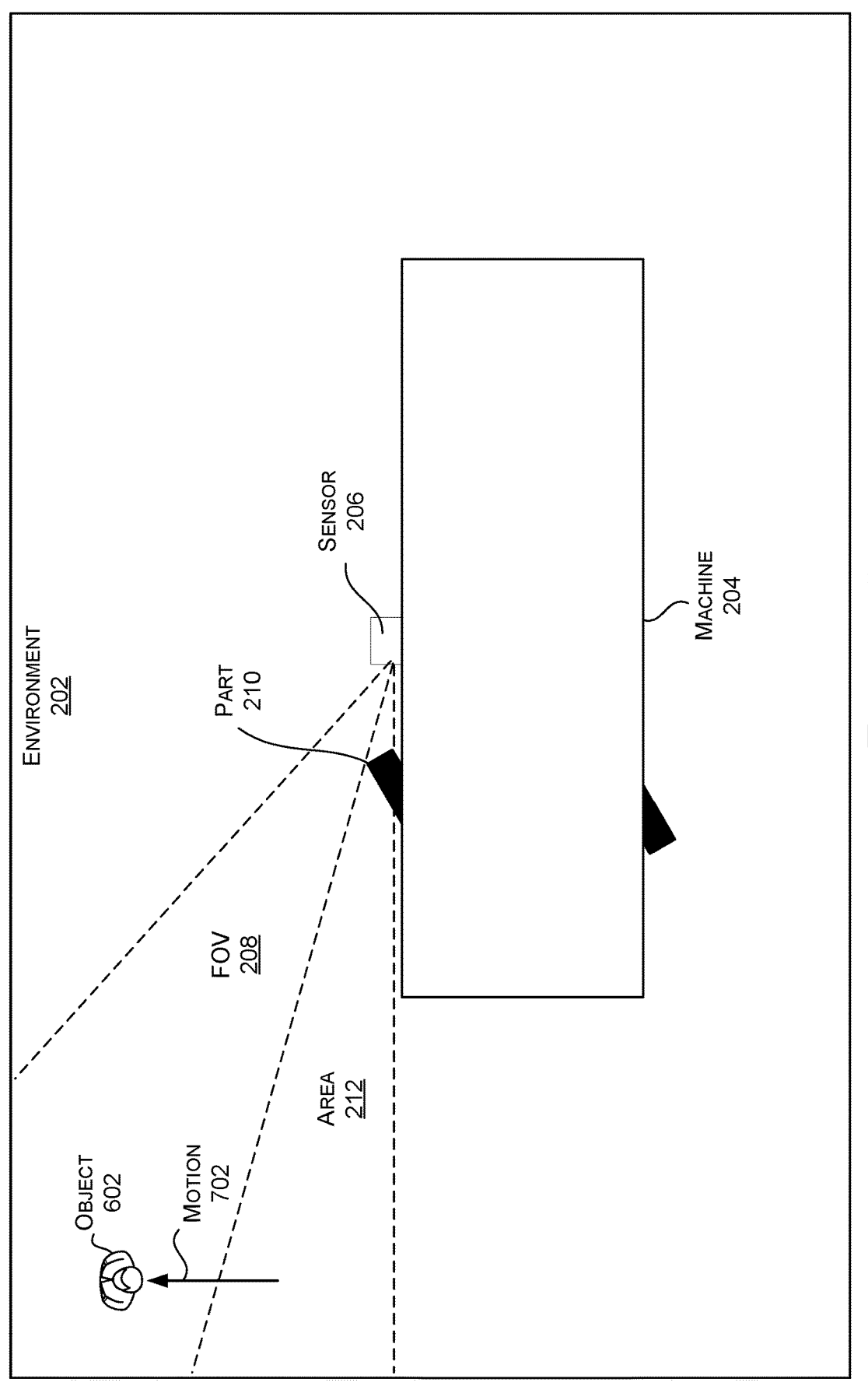
FIG. 7 illustrates an example of determining when an object is exiting an occluded area associated with a machine, in accordance with some embodiments of the present disclosure.

For instance, FIG. 7 illustrates an example of determining when the object 602 is exiting the occluded area 212 associated with the machine 204, in accordance with some embodiments of the present disclosure. As shown by the example of FIG. 7, the object 602 may move from being located within the occluded area 212 to being located outside of the occluded area 212, which is indicated by motion 702. As such, the obstacle component 110 may detect the object 602 based at least on the object 602 exiting the occluded area 212. For example, the obstacle component 10 may detect the object 602 based at least on sensor data generated using the sensor 206 again representing the object 602. Based at least on the detection, the obstacle component 110 may determine that the object 602 has exited the occluded area 212.

Referring back to the example of FIG. 1, in some examples, the obstacle component 110 may perform additional and/or alternative processes when determining the object(s) that enters the occluded area and/or the object(s) that exits the occluded area. For example, and for an object, the obstacle component 110 may store information associated with the object when determining that the object entered the occluded area and/or is located within the occluded area. In some examples, the information may include identifying information, such as information representing one or more characteristics associated with the object (facial recognition information, clothing information, etc.). The obstacle component 110 may then use the stored information to determine when that exact object has excited the occluded area. For example, the obstacle component 110 may match the stored information to additional information determined for the object when exiting the occluded area. This way, the obstacle component 110 may not only determine when objects enter or exit the occluded area, but also determine which objects enter or exit the occluded area.

The process 100 may include a control component 114 generating control data 116 for controlling one or more parts of the machine. For instance, the control component 114 may generate the control data 116 to change a pose associated with a part of the machine, where the changing of the pose is to reduce the size of the occluded area. This way, the obstacle component 110 may better determine and/or verify whether one or more objects are still located within the occluded area. For example, and referring again to the examples of FIGS. 2A-2B, the part 210 of the machine 204 may initially include the pose associated with FIG. 2B. Based at least on the part 210 including the pose, the part 210 may cause the occluded area 212 of the environment 202. As such, the control component 114 may generate control data (e.g., the control data 116) that causes the part 210 to change poses to the pose associated with FIG. 2A. By changing the pose, the occluded area 212 is reduced and/or eliminated such that the obstacle component 110 may determine whether one or more objects are located within the occluded area 212.

Referring back to the example of FIG. 1, the process 100 may include a tracking component 118 receiving obstacle data 120 from the obstacle component 110. As described herein, the obstacle data 120 may indicate when one or more objects have entered the occluded area, which object(s) has entered the occluded area, when one or more objects have exited the occluded area, which object(s) have exited the occluded area, and/or any other information associated with the occluded area. The process 100 may then include the tracking component 118 tracking the object(s) within the occluded area. For example, the tracking component 118 may track the object(s) by determining a number of objects likely located within the occluded area, where the number of objects may be represented by tracking data 122. The tracking component 118 may then continue to update the number of objects based on receiving additional obstacle data 120 from the obstacle component 110. For example, if additional obstacle data 120 indicates that a new object entered the occluded area, then the tracking component 118 may increase the number of objects. However, if additional obstacle data 120 indicates that an object exited the occluded area, then the tracking component 118 may reduce the number of objects.

The process 100 may also include the tracking component 118 generating control data 124 for controlling the machine within the environment. For instance, if the tracking component 118 determines that one or more objects are located within the occluded area and/or may be located within the occluded area, then the tracking component 118 may generate first control data 124 representing one or more first operations for the machine to perform. In some examples, the first operation(s) may include causing the machine to stop, causing the machine to navigate along a new trajectory that it outside of the occluded area, causing the machine to output one or more warnings associated with the occluded area, and/or any other operation. As described herein, outputting a warning may include, but is not limited to, outputting a message to one or more passengers of the machine indicating that the object(s) is and/or may be located within the occluded area, outputting a sound or other type of warning to the object(s) that is and/or may be located within the occluded area, and/or the like.

Additionally, if the tracking component 118 determines that no object is located within the occluded area, then the tracking component 118 may generate second control data 124 representing one or more second operations for the machine to perform. For instance, the second operation(s)

may include at least causing the machine to continue navigating along the current trajectory that includes at least a portion of the occluded area. In some examples, the tracking component 118 may generate such second control data 124 since the tracking component 118 determines that it is safe to navigate along the current trajectory without the risk of colliding with any objects.

Figure 10:
FIG. 10 illustrates a flow diagram showing a method for controlling a part of a machine in order to verify whether an object is located within an occluded area, in accordance with some embodiments of the present disclosure.

Now referring to FIGS. 8-10, each block of methods 800, 900, and 1000, described herein, comprises a computing process that may be performed using any combination of hardware, firmware, and/or software. For instance, various functions may be carried out by a processor executing instructions stored in memory. The methods 800, 900, and 1000 may also be embodied as computer-usable instructions stored on computer storage media. The methods 800 and 900 may be provided by a standalone application, a service or hosted service (standalone or in combination with another hosted service), or a plug-in to another product, to name a few. In addition, the methods 800, 900, and 1000 described, by way of example, with respect to FIG. 1. However, these methods 800, 900, and 1000 may additionally or alternatively be executed by any one system, or any combination of systems, including, but not limited to, those described herein.

FIG. 8 is a flow diagram showing a method 800 for determining whether one or more objects are located within an occluded area associated with a machine, in accordance with some embodiments of the present disclosure. The method 800, at block B802, may include determining, based at least on first sensor data generated using a first sensor of a machine, that a part of the machine is occluding an area of the environment. For instance, the occlusion component 106 may receive the first sensor data 104 generated using the first sensor(s) 102. The occlusion component 106 may then process the first sensor data 104 and, based at least on the processing, determine that the part of the machine is occluding the area of the environment. As described herein, the occlusion component 106 may determine the occluded area using one or more machine learning models, data that associates poses associated with the part of the machine with occluded areas, and/or using any other technique.

The method 800, at block B804, may include determining, based at least on at least one of the first sensor data or second sensor data generated using a second sensor of the machine, whether an object may be located within the area of the environment. For instance, the obstacle component 110 may receive the first sensor data 104 and/or the second sensor data 104 generated using the second sensor(s) 102. The obstacle component 110 may then process the first sensor data 104 and/or the second sensor data 104 and, based at least on the processing, determine information associated with the object. Additionally, the obstacle component 110 may use the information to determine whether the object is located within the occluded area of the environment. For example, the obstacle component 110 may use the location and/or direction of travel associated with the object to determine whether the object moved within the occluded area.

If, at block B804, it is determined that the object may be located within the area of the environment, then the method 800, at block B806, may include causing the machine to perform one or more first operations. For instance, if the obstacle component 110 determines that the object may be located within the occluded area, then the tracking component 118 may update the tracking data 122 to indicate that the object may be located within the occluded area. The tracking component 118 may then cause the machine to perform one or more first operations, such as navigating a new trajectory and/or stopping.

However, if, at block B804, it is determined that the object is not located within the area of the environment, then the method 800, at block B808, may include causing the machine to perform one or more second operations. For instance, if the obstacle component 110 determines that the object is not located within the occluded area, then the tracking component 118 may update the tracking data 122 to indicate that the object is not located within the occluded area. The tracking component 118 may then cause the machine to perform one or more second operations, such as navigating along the current trajectory.

FIG. 9 is a flow diagram showing a method 900 for determining a trajectory for a machine based at least on an occluded area of an environment, in accordance with some embodiments of the present disclosure. The method 900, at block B902, may include determining one or more trajectories for navigating a machine from a first location to a second location. For instance, the trajectory component 108 may determine the one or more trajectories for navigating the machine within the environment from the first location (e.g., a current location) to the second location (e.g., a destination location). As described herein, in some examples, a respective trajectory (e.g., each trajectory) may be associated with moving a part of the machine to a specific pose, such as by turning one or more wheels of the machine to turn.

The method 900, at block B904, may include determining one or more occluded areas associated with the one or more trajectories. For instance, the occlusion component 106 may determine the one or more occluded areas associated with the one or more trajectories. As described herein, in some examples, the occlusion component 106 may determine an occluded area associated with a trajectory based at least on a pose associated with the part of the machine when the machine navigates according to the trajectory. For instance, if the part includes a wheel of the machine, then the occlusion component 106 may determine the occluded area based at least on one or more poses that the wheel will include to cause the machine to navigate along the trajectory.

The method 900, at block B906, may include selecting, based at least on the one or more occluded areas, a trajectory from the one or more trajectories. For instance, the trajectory component 108 may use the one or more occluded areas to select the trajectory for the machine to navigate. As described herein, in some examples, the trajectory component 108 may select the trajectory that is associated with the minimum occluded area. However, in other examples, the trajectory component 108 may use one or more additional and/or alternative factors when selecting the trajectory.

FIG. 10 illustrates a flow diagram showing a method 1000 for controlling a part of a machine in order to verify whether an object is located within an occluded area, in accordance with some embodiments of the present disclosure. For instance, the method 1000, at block B1002, may include determining, based at least on a part being in a first pose, whether an object is located within an occluded area caused by the part. For instance, the occlusion component 106 may determine the occluded area of the environment when the part is in the first pose, such as by using one or more of the processes described herein. The obstacle component 110 may then determine whether the object is located within the occluded area.

The method 1000, at block B1004, may include causing the part to move from the first pose to a second pose in order to reduce the occluded area. For instance, the control component 114 may cause the part to move from the first pose to the second pose in order to reduce the occluded area. As described herein, in some examples, the control component 114 may cause the part to move to the second pose based at least on generating the control data 116 that causes the part to move.

The method 1000, at block B1006, may include verifying whether the object is located in the occluded area based at least on the part being in the second pose. For instance, the obstacle component 110 may then verify whether the object is located within the occluded area since at least a portion of the occluded area is no longer occluded based on the part being in the second pose.

Example Autonomous Vehicle

Figure 11A:
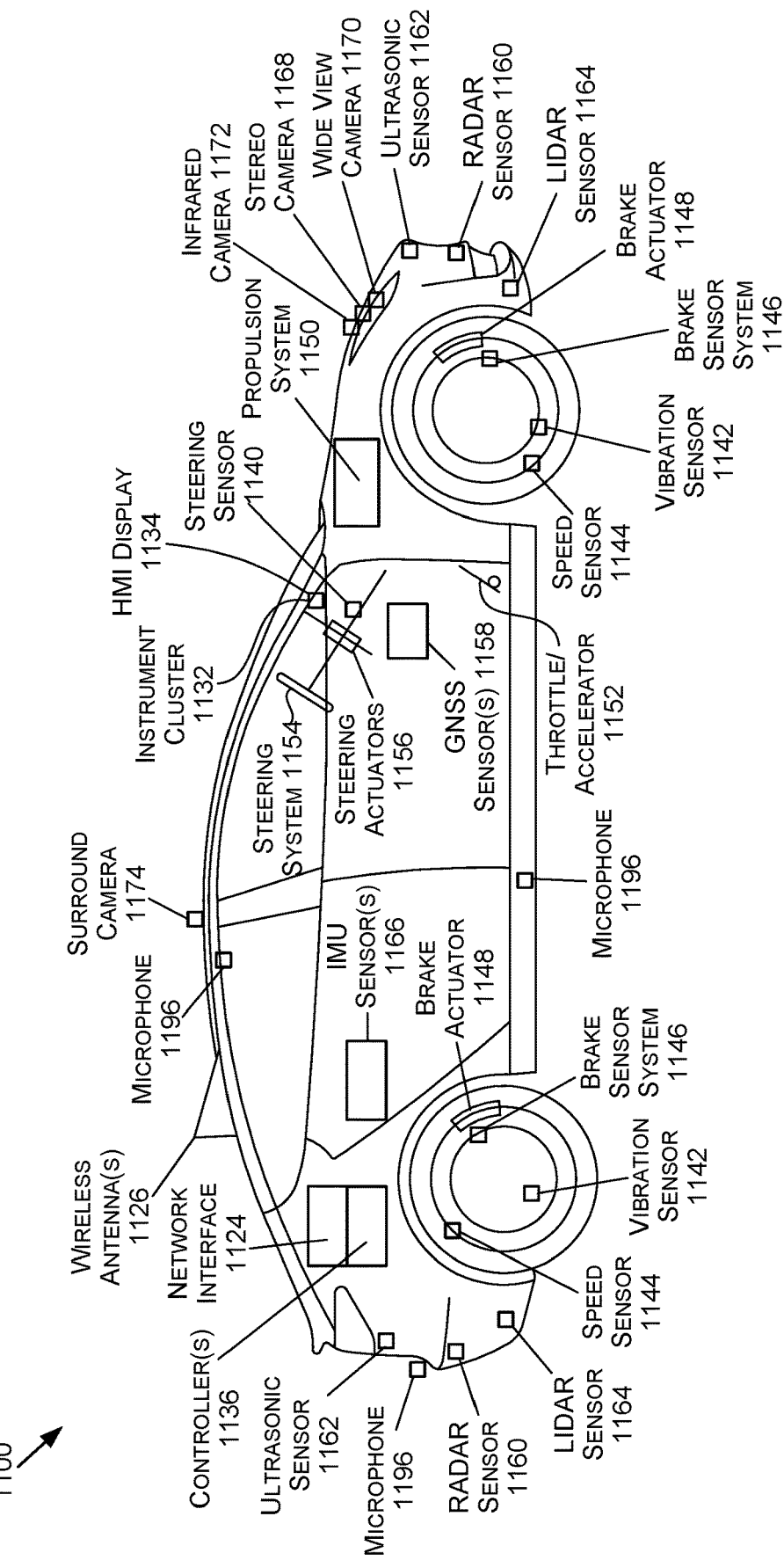
FIG. 11A is an illustration of an example autonomous vehicle, in accordance with some embodiments of the present disclosure.

FIG. 11A is an illustration of an example autonomous vehicle 1100, in accordance with some embodiments of the present disclosure. The autonomous vehicle 1100 (alternatively referred to herein as the "vehicle 1100") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1100 may be capable of functionality in accordance with one or more of Level 3-Level 5 of the autonomous driving levels. The vehicle 1100 may be capable of functionality in accordance with one or more of Level 1-Level 5 of the autonomous driving levels. For example, the vehicle 1100 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 1100 or other machine, such as being fully autonomous, being highly autonomous, being conditionally autonomous, being partially autonomous, providing assistive autonomy, being semi-autonomous, being primarily autonomous, or other designation.

The vehicle 1100 may include components such as a chassis, a vehicle body, wheels (e.g., 2, 4, 6, 8, 18, etc.), tires, axles, and other components of a vehicle. The vehicle 1100 may include a propulsion system 1150, such as an internal combustion engine, hybrid electric power plant, an all-electric engine, and/or another propulsion system type. The propulsion system 1150 may be connected to a drive train of the vehicle 1100, which may include a transmission, to enable the propulsion of the vehicle 1100. The propulsion system 1150 may be controlled in response to receiving signals from the throttle/accelerator 1152.

A steering system 1154, which may include a steering wheel, may be used to steer the vehicle 1100 (e.g., along a desired path or route) when the propulsion system 1150 is operating (e.g., when the vehicle is in motion). The steering system 1154 may receive signals from a steering actuator 1156. The steering wheel may be optional for full automation (Level 5) functionality.

The brake sensor system 1146 may be used to operate the vehicle brakes in response to receiving signals from the brake actuators 1148 and/or brake sensors.

Controller(s) 1136, which may include one or more system on chips (SoCs) 1104 (FIG. 11C) and/or GPU(s), may provide signals (e.g., representative of commands) to one or more components and/or systems of the vehicle 1100. For example, the controller(s) may send signals to operate the vehicle brakes via one or more brake actuators 1148, to operate the steering system 1154 via one or more steering actuators 1156, to operate the propulsion system 1150 via one or more throttle/accelerators 1152. The controller(s) 1136 may include one or more onboard (e.g., integrated) computing devices (e.g., supercomputers) that process sensor signals, and output operation commands (e.g., signals representing commands) to enable autonomous driving and/or to assist a human driver in driving the vehicle 1100. The controller(s) 1136 may include a first controller 1136 for autonomous driving functions, a second controller 1136 for functional safety functions, a third controller 1136 for artificial intelligence functionality (e.g., computer vision), a fourth controller 1136 for infotainment functionality, a fifth controller 1136 for redundancy in emergency conditions, and/or other controllers. In some examples, a single controller 1136 may handle two or more of the above functionalities, two or more controllers 1136 may handle a single functionality, and/or any combination thereof.

The controller(s) 1136 may provide the signals for controlling one or more components and/or systems of the vehicle 1100 in response to sensor data received from one or more sensors (e.g., sensor inputs). The sensor data may be received from, for example and without limitation, global navigation satellite systems ("GNSS") sensor(s) 1158 (e.g., Global Positioning System sensor(s)), RADAR sensor(s) 1160, ultrasonic sensor(s) 1162, LIDAR sensor(s) 1164, inertial measurement unit (IMU) sensor(s) 1166 (e.g., accelerometer(s), gyroscope(s), magnetic compass(es), magnetometer(s), etc.), microphone(s) 1196, stereo camera(s) 1168, wide-view camera(s) 1170 (e.g., fisheye cameras), infrared camera(s) 1172, surround camera(s) 1174 (e.g., 360 degree cameras), long-range and/or mid-range camera(s) 1198, speed sensor(s) 1144 (e.g., for measuring the speed of the vehicle 1100), vibration sensor(s) 1142, steering sensor(s) 1140, brake sensor(s) (e.g., as part of the brake sensor system 1146), and/or other sensor types.

One or more of the controller(s) 1136 may receive inputs (e.g., represented by input data) from an instrument cluster 1132 of the vehicle 1100 and provide outputs (e.g., represented by output data, display data, etc.) via a human-machine interface (HMI) display 1134, an audible annunciator, a loudspeaker, and/or via other components of the vehicle 1100. The outputs may include information such as vehicle velocity, speed, time, map data (e.g., the High Definition ("HD") map 1122 of FIG. 11C), location data (e.g., the vehicle's 1100 location, such as on a map), direction, location of other vehicles (e.g., an occupancy grid), information about objects and status of objects as perceived by the controller(s) 1136, etc. For example, the HMI display 1134 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1100 further includes a network interface 1124 which may use one or more wireless antenna(s) 1126 and/or modem(s) to communicate over one or more networks. For example, the network interface 1124 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 1126 may also enable communication between objects in the environment (e.g., vehicles, mobile devices, etc.), using local area network(s), such as Bluetooth, Bluetooth Low Energy ("LE"), Z-Wave, ZigBcc, etc., and/or low power wide-area network(s) ("LPWANs"), such as LoRaWAN, SigFox, etc.

Figure 11B:
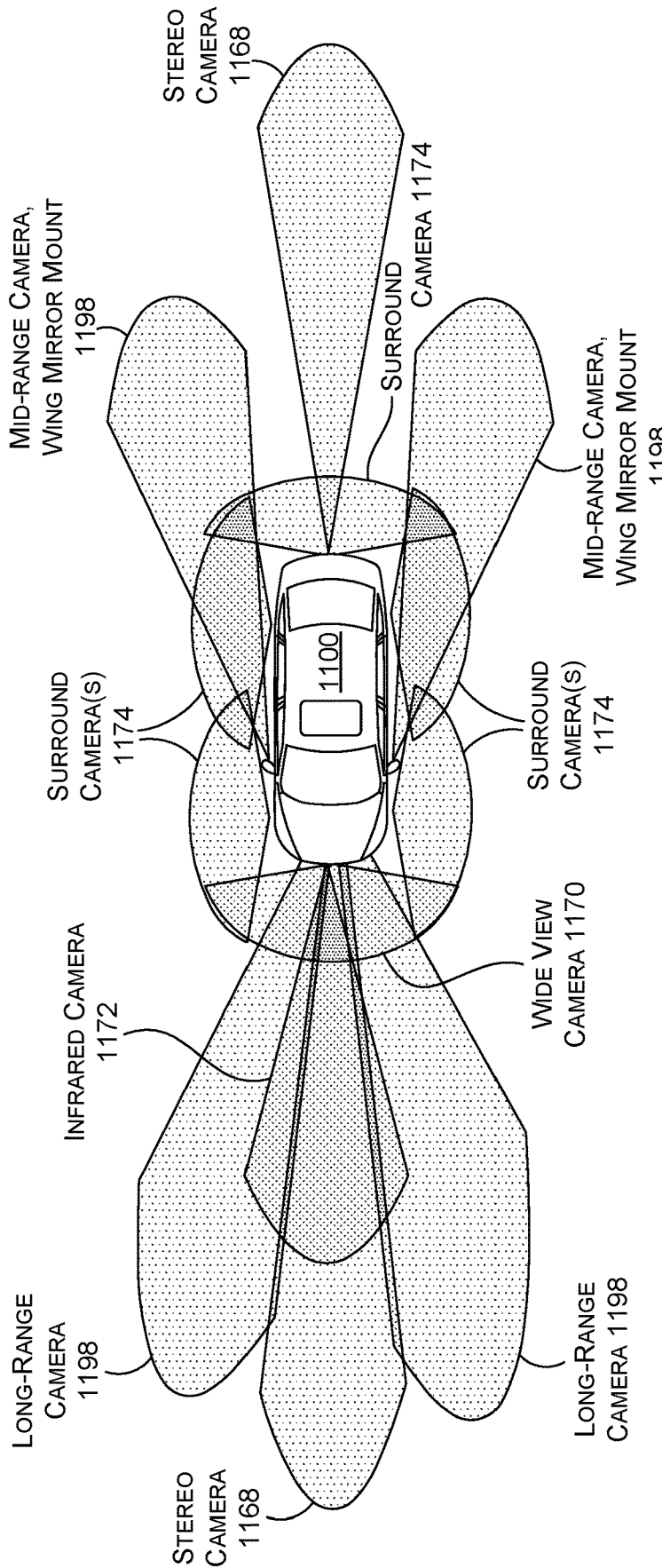
FIG. 11B is an example of camera locations and fields of view for the example autonomous vehicle of FIG. 11A, in accordance with some embodiments of the present disclosure.

FIG. 11B is an example of camera locations and fields of view for the example autonomous vehicle 1100 of FIG. 11A, in accordance with some embodiments of the present disclosure. The cameras and respective fields of view are one example embodiment and are not intended to be limiting. For example, additional and/or alternative cameras may be included and/or the cameras may be located at different locations on the vehicle 1100.

The camera types for the cameras may include, but are not limited to, digital cameras that may be adapted for use with the components and/or systems of the vehicle 1100. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1100 (e.g., front-facing cameras) may be used for surround view, to help identify forward facing paths and obstacles, as well aid in, with the help of one or more controllers 1136 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 1170 that may be used to perceive objects coming into view from the periphery (e.g., pedestrians, crossing traffic or bicycles). Although only one wide-view camera is illustrated in FIG. 11B, there may be any number (including zero) of wide-view cameras 1170 on the vehicle 1100. In addition, any number of long-range camera(s) 1198 (e.g., a long-view stereo camera pair) may be used for depth-based object detection, especially for objects for which a neural network has not yet been trained. The long-range camera(s) 1198 may also be used for object detection and classification, as well as basic object tracking.

Any number of stereo cameras 1168 may also be included in a front-facing configuration. In at least one embodiment, one or more of stereo camera(s) 1168 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 1168 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1168 may be used in addition to, or alternatively from, those described herein.

Cameras with a field of view that include portions of the environment to the side of the vehicle 1100 (e.g., side-view cameras) may be used for surround view, providing information used to create and update the occupancy grid, as well as to generate side impact collision warnings. For example, surround camera(s) 1174 (e.g., four surround cameras 1174 as illustrated in FIG. 11B) may be positioned to on the vehicle 1100. The surround camera(s) 1174 may include wide-view camera(s) 1170, fisheye camera(s), 360 degree camera(s), and/or the like. Four example, four fisheye cameras may be positioned on the vehicle's front, rear, and sides. In an alternative arrangement, the vehicle may use three surround camera(s) 1174 (e.g., left, right, and rear), and may leverage one or more other camera(s) (e.g., a forward-facing camera) as a fourth surround view camera.

Cameras with a field of view that include portions of the environment to the rear of the vehicle 1100 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1198, stereo camera(s) 1168), infrared camera(s) 1172, etc.), as described herein.

Figure 11C:
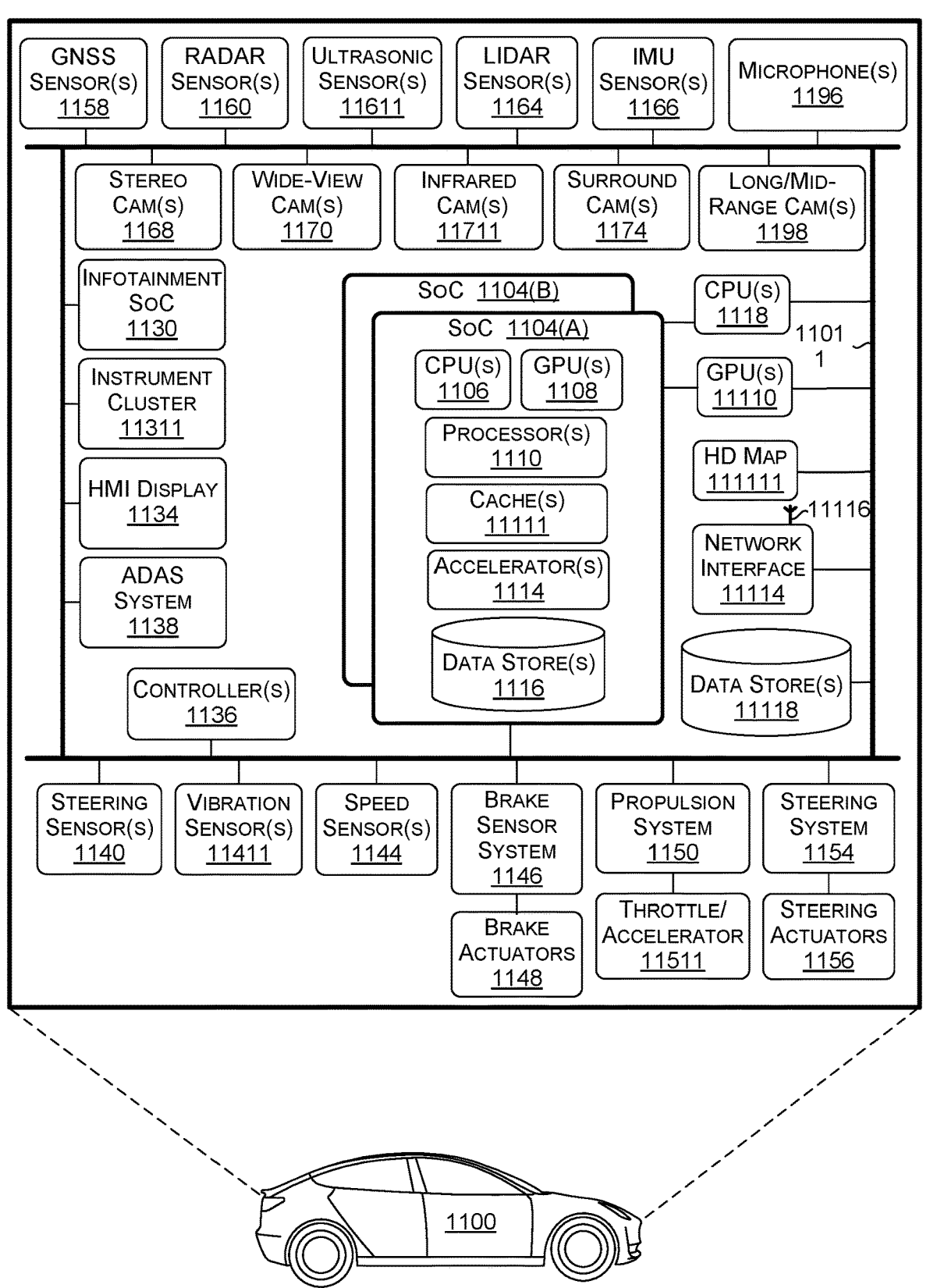
FIG. 11C is a block diagram of an example system architecture for the example autonomous vehicle of FIG. 11A, in accordance with some embodiments of the present disclosure.

FIG. 11C is a block diagram of an example system architecture for the example autonomous vehicle 1100 of FIG. 11A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1100 in FIG. 11C are illustrated as being connected via bus 1102. The bus 1102 may include a Controller Area Network (CAN) data interface (alternatively referred to herein as a "CAN bus"). A CAN may be a network inside the vehicle 1100 used to aid in control of various features and functionality of the vehicle 1100, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1102 is described herein as being a CAN bus, this is not intended to be limiting. For example, in addition to, or alternatively from, the CAN bus, FlexRay and/or Ethernet may be used. Additionally, although a single line is used to represent the bus 1102, this is not intended to be limiting. For example, there may be any number of busses 1102, which may include one or more CAN busses, one or more FlexRay busses, one or more Ethernet busses, and/or one or more other types of busses using a different protocol. In some examples, two or more busses 1102 may be used to perform different functions, and/or may be used for redundancy. For example, a first bus 1102 may be used for collision avoidance functionality and a second bus 1102 may be used for actuation control. In any example, each bus 1102 may communicate with any of the components of the vehicle 1100, and two or more busses 1102 may communicate with the same components. In some examples, each SoC 1104, each controller 1136, and/or each computer within the vehicle may have access to the same input data (e.g., inputs from sensors of the vehicle 1100), and may be connected to a common bus, such the CAN bus.

The vehicle 1100 may include one or more controller(s) 1136, such as those described herein with respect to FIG. 11A. The controller(s) 1136 may be used for a variety of functions. The controller(s) 1136 may be coupled to any of the various other components and systems of the vehicle 1100, and may be used for control of the vehicle 1100, artificial intelligence of the vehicle 1100, infotainment for the vehicle 1100, and/or the like.

The vehicle 1100 may include a system(s) on a chip (SoC) 1104. The SoC 1104 may include CPU(s) 1106, GPU(s) 1108, processor(s) 1110, cache(s) 1112, accelerator(s) 1114, data store(s) 1116, and/or other components and features not illustrated. The SoC(s) 1104 may be used to control the vehicle 1100 in a variety of platforms and systems. For example, the SoC(s) 1104 may be combined in a system (e.g., the system of the vehicle 1100) with an HD map 1122 which may obtain map refreshes and/or updates via a network interface 1124 from one or more servers (e.g., server(s) 1178 of FIG. 11D).

The CPU(s) 1106 may include a CPU cluster or CPU complex (alternatively referred to herein as a "CCPLEX"). The CPU(s) 1106 may include multiple cores and/or L2 caches. For example, in some embodiments, the CPU(s) 1106 may include eight cores in a coherent multi-processor configuration. In some embodiments, the CPU(s) 1106 may include four dual-core clusters where each cluster has a dedicated L2 cache (e.g., a 2 MB L2 cache). The CPU(s) 1106 (e.g., the CCPLEX) may be configured to support simultaneous cluster operation enabling any combination of the clusters of the CPU(s) 1106 to be active at any given time.

The CPU(s) 1106 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1106 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1108 may include an integrated GPU (alternatively referred to herein as an "iGPU"). The GPU(s) 1108 may be programmable and may be efficient for parallel workloads. The GPU(s) 1108, in some examples, may use an enhanced tensor instruction set. The GPU(s) 1108 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1108 may include at least eight streaming microprocessors. The GPU(s) 1108 may use compute application programming interface(s) (API(s)). In addition, the GPU(s) 1108 may use one or more parallel computing platforms and/or programming models (e.g., NVIDIA's CUDA).

The GPU(s) 1108 may be power-optimized for best performance in automotive and embedded use cases. For example, the GPU(s) 1108 may be fabricated on a Fin field-effect transistor (FinFET). However, this is not intended to be limiting and the GPU(s) 1108 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1108 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1108 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1108 to access the CPU(s) 1106 page tables directly. In such examples, when the GPU(s) 1108 memory management unit (MMU) experiences a miss, an address translation request may be transmitted to the CPU(s) 1106. In response, the CPU(s) 1106 may look in its page tables for the virtual-to-physical mapping for the address and transmits the translation back to the GPU(s) 1108. As such, unified memory technology may allow a single unified virtual address space for memory of both the CPU(s) 1106 and the GPU(s) 1108, thereby simplifying the GPU(s) 1108 programming and porting of applications to the GPU(s) 1108.

In addition, the GPU(s) 1108 may include an access counter that may keep track of the frequency of access of the GPU(s) 1108 to memory of other processors. The access counter may help ensure that memory pages are moved to the physical memory of the processor that is accessing the pages most frequently.

The SoC(s) 1104 may include any number of cache(s) 1112, including those described herein. For example, the cache(s) 1112 may include an L3 cache that is available to both the CPU(s) 1106 and the GPU(s) 1108 (e.g., that is connected both the CPU(s) 1106 and the GPU(s) 1108). The cache(s) 1112 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1104 may include an arithmetic logic unit(s) (ALU(s)) which may be leveraged in performing processing with respect to any of the variety of tasks or operations of the vehicle 1100—such as processing DNNs. In addition, the SoC(s) 1104 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 1106 and/or GPU(s) 1108.

The SoC(s) 1104 may include one or more accelerators 1114 (e.g., hardware accelerators, software accelerators, or a combination thereof). For example, the SoC(s) 1104 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1108 and to off-load some of the tasks of the GPU(s) 1108 (e.g., to free up more cycles of the GPU(s) 1108 for performing other tasks). As an example, the accelerator(s) 1114 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1114 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1108, and by using an inference accelerator, for example, a designer may target either the DLA(s) or the GPU(s) 1108 for any function. For example, the designer may focus processing of CNNs and floating point operations on the DLA(s) and leave other functions to the GPU(s) 1108 and/or other accelerator(s) 1114.

The accelerator(s) 1114 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1106. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1114 (e.g., the hardware acceleration cluster) may include a computer vision network on-chip and SRAM, for providing a high-bandwidth, low latency SRAM for the accelerator(s) 1114. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1104 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 1114 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1166 output that correlates with the vehicle 1100 orientation, distance, 3D location estimates of the object obtained from the neural network and/or other sensors (e.g., LIDAR sensor(s) 1164 or RADAR sensor(s) 1160), among others.

The SoC(s) 1104 may include data store(s) 1116 (e.g., memory). The data store(s) 1116 may be on-chip memory of the SoC(s) 1104, which may store neural networks to be executed on the GPU and/or the DLA. In some examples, the data store(s) 1116 may be large enough in capacity to store multiple instances of neural networks for redundancy and safety. The data store(s) 1112 may comprise L2 or L3 cache(s) 1112. Reference to the data store(s) 1116 may include reference to the memory associated with the PVA, DLA, and/or other accelerator(s) 1114, as described herein.

The SoC(s) 1104 may include one or more processor(s) 1110 (e.g., embedded processors). The processor(s) 1110 may include a boot and power management processor that may be a dedicated processor and subsystem to handle boot power and management functions and related security enforcement. The boot and power management processor may be a part of the SoC(s) 1104 boot sequence and may provide runtime power management services. The boot power and management processor may provide clock and voltage programming, assistance in system low power state transitions, management of SoC(s) 1104 thermals and temperature sensors, and/or management of the SoC(s) 1104 power states. Each temperature sensor may be implemented as a ring-oscillator whose output frequency is proportional to temperature, and the SoC(s) 1104 may use the ring-oscillators to detect temperatures of the CPU(s) 1106, GPU(s) 1108, and/or accelerator(s) 1114. If temperatures are determined to exceed a threshold, the boot and power management processor may enter a temperature fault routine and put the SoC(s) 1104 into a lower power state and/or put the vehicle 1100 into a chauffeur to safe stop mode (e.g., bring the vehicle 1100 to a safe stop).

The processor(s) 1110 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1110 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1110 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1110 may further include a real-time camera engine that may include a dedicated processor subsystem for handling real-time camera management.

The processor(s) 1110 may further include a high-dynamic range signal processor that may include an image signal processor that is a hardware engine that is part of the camera processing pipeline.

The processor(s) 1110 may include a video image compositor that may be a processing block (e.g., implemented on a microprocessor) that implements video post-processing functions needed by a video playback application to produce the final image for the player window. The video image compositor may perform lens distortion correction on wide-view camera(s) 1170, surround camera(s) 1174, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1108 is not required to continuously render new surfaces. Even when the GPU(s) 1108 is powered on and active doing 3D rendering, the video image compositor may be used to offload the GPU(s) 1108 to improve performance and responsiveness.

The SoC(s) 1104 may further include a mobile industry processor interface (MIPI) camera serial interface for receiving video and input from cameras, a high-speed interface, and/or a video input block that may be used for camera and related pixel input functions. The SoC(s) 1104 may further include an input/output controller(s) that may be controlled by software and may be used for receiving I/O signals that are uncommitted to a specific role.

The SoC(s) 1104 may further include a broad range of peripheral interfaces to enable communication with peripherals, audio codecs, power management, and/or other devices. The SoC(s) 1104 may be used to process data from cameras (e.g., connected over Gigabit Multimedia Serial Link and Ethernet), sensors (e.g., LIDAR sensor(s) 1164, RADAR sensor(s) 1160, etc. that may be connected over Ethernet), data from bus 1102 (e.g., speed of vehicle 1100, steering wheel position, etc.), data from GNSS sensor(s) 1158 (e.g., connected over Ethernet or CAN bus). The SoC(s) 1104 may further include dedicated high-performance mass storage controllers that may include their own DMA engines, and that may be used to free the CPU(s) 1106 from routine data management tasks.

The SoC(s) 1104 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1104 may be faster, more reliable, and even more energy-efficient and space-efficient than conventional systems. For example, the accelerator(s) 1114, when combined with the CPU(s) 1106, the GPU(s) 1108, and the data store(s) 1116, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1120) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1108.

In some examples, a CNN for facial recognition and vehicle owner identification may use data from camera sensors to identify the presence of an authorized driver and/or owner of the vehicle 1100. The always on sensor processing engine may be used to unlock the vehicle when the owner approaches the driver door and turn on the lights, and, in security mode, to disable the vehicle when the owner leaves the vehicle. In this way, the SoC(s) 1104 provide for security against theft and/or carjacking.

In another example, a CNN for emergency vehicle detection and identification may use data from microphones 1196 to detect and identify emergency vehicle sirens. In contrast to conventional systems, that use general classifiers to detect sirens and manually extract features, the SoC(s) 1104 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1158. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1162, until the emergency vehicle(s) passes.

The vehicle may include a CPU(s) 1118 (e.g., discrete CPU(s), or dCPU(s)), that may be coupled to the SoC(s) 1104 via a high-speed interconnect (e.g., PCIe). The CPU(s) 1118 may include an X86 processor, for example. The CPU(s) 1118 may be used to perform any of a variety of functions, including arbitrating potentially inconsistent results between ADAS sensors and the SoC(s) 1104, and/or monitoring the status and health of the controller(s) 1136 and/or infotainment SoC 1130, for example.

The vehicle 1100 may include a GPU(s) 1120 (e.g., discrete GPU(s), or dGPU(s)), that may be coupled to the SoC(s) 1104 via a high-speed interconnect (e.g., NVIDIA's NVLINK). The GPU(s) 1120 may provide additional artificial intelligence functionality, such as by executing redundant and/or different neural networks, and may be used to train and/or update neural networks based on input (e.g., sensor data) from sensors of the vehicle 1100.

The vehicle 1100 may further include the network interface 1124 which may include one or more wireless antennas 1126 (e.g., one or more wireless antennas for different communication protocols, such as a cellular antenna, a Bluetooth antenna, etc.). The network interface 1124 may be used to enable wireless connectivity over the Internet with the cloud (e.g., with the server(s) 1178 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1100 information about vehicles in proximity to the vehicle 1100 (e.g., vehicles in front of, on the side of, and/or behind the vehicle 1100). This functionality may be part of a cooperative adaptive cruise control functionality of the vehicle 1100.

The network interface 1124 may include a SoC that provides modulation and demodulation functionality and enables the controller(s) 1136 to communicate over wireless networks. The network interface 1124 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1100 may further include data store(s) 1128 which may include off-chip (e.g., off the SoC(s) 1104) storage. The data store(s) 1128 may include one or more storage elements including RAM, SRAM, DRAM, VRAM, Flash, hard disks, and/or other components and/or devices that may store at least one bit of data.

The vehicle 1100 may further include GNSS sensor(s) 1158. The GNSS sensor(s) 1158 (e.g., GPS, assisted GPS sensors, differential GPS (DGPS) sensors, etc.), to assist in mapping, perception, occupancy grid generation, and/or path planning functions. Any number of GNSS sensor(s) 1158 may be used, including, for example and without limitation, a GPS using a USB connector with an Ethernet to Serial (RS-232) bridge.

The vehicle 1100 may further include RADAR sensor(s) 1160. The RADAR sensor(s) 1160 may be used by the vehicle 1100 for long-range vehicle detection, even in darkness and/or severe weather conditions. RADAR functional safety levels may be ASIL B. The RADAR sensor(s) 1160 may use the CAN and/or the bus 1102 (e.g., to transmit data generated by the RADAR sensor(s) 1160) for control and to access object tracking data, with access to Ethernet to access raw data in some examples. A wide variety of RADAR sensor types may be used. For example, and without limitation, the RADAR sensor(s) 1160 may be suitable for front, rear, and side RADAR use. In some example, Pulse Doppler RADAR sensor(s) are used.

The RADAR sensor(s) 1160 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1160 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1100 surroundings at higher speeds with minimal interference from traffic in adjacent lanes. The other two antennae may expand the field of view, making it possible to quickly detect vehicles entering or leaving the vehicle's 1100 lane.

Mid-range RADAR systems may include, as an example, a range of up to 1160 m (front) or 80 m (rear), and a field of view of up to 42 degrees (front) or 1150 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1100 may further include ultrasonic sensor(s) 1162. The ultrasonic sensor(s) 1162, which may be positioned at the front, back, and/or the sides of the vehicle 1100, may be used for park assist and/or to create and update an occupancy grid. A wide variety of ultrasonic sensor(s) 1162 may be used, and different ultrasonic sensor(s) 1162 may be used for different ranges of detection (e.g., 2.5 m, 4 m). The ultrasonic sensor(s) 1162 may operate at functional safety levels of ASIL B.

The vehicle 1100 may include LIDAR sensor(s) 1164. The LIDAR sensor(s) 1164 may be used for object and pedestrian detection, emergency braking, collision avoidance, and/or other functions. The LIDAR sensor(s) 1164 may be functional safety level ASIL B. In some examples, the vehicle 1100 may include multiple LIDAR sensors 1164 (e.g., two, four, six, etc.) that may use Ethernet (e.g., to provide data to a Gigabit Ethernet switch).

In some examples, the LIDAR sensor(s) 1164 may be capable of providing a list of objects and their distances for a 360-degree field of view. Commercially available LIDAR sensor(s) 1164 may have an advertised range of approximately 1100 m, with an accuracy of 2 cm-3 cm, and with support for a 1100 Mbps Ethernet connection, for example. In some examples, one or more non-protruding LIDAR sensors 1164 may be used. In such examples, the LIDAR sensor(s) 1164 may be implemented as a small device that may be embedded into the front, rear, sides, and/or corners of the vehicle 1100. The LIDAR sensor(s) 1164, in such examples, may provide up to a 120-degree horizontal and 35-degree vertical field-of-view, with a 200 m range even for low-reflectivity objects. Front-mounted LIDAR sensor(s) 1164 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1100. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1164 may be less susceptible to motion blur, vibration, and/or shock.

The vehicle may further include IMU sensor(s) 1166. The IMU sensor(s) 1166 may be located at a center of the rear axle of the vehicle 1100, in some examples. The IMU sensor(s) 1166 may include, for example and without limitation, an accelerometer(s), a magnetometer(s), a gyroscope(s), a magnetic compass(es), and/or other sensor types. In some examples, such as in six-axis applications, the IMU sensor(s) 1166 may include accelerometers and gyroscopes, while in nine-axis applications, the IMU sensor(s) 1166 may include accelerometers, gyroscopes, and magnetometers.

In some embodiments, the IMU sensor(s) 1166 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1166 may enable the vehicle 1100 to estimate heading without requiring input from a magnetic sensor by directly observing and correlating the changes in velocity from GPS to the IMU sensor(s) 1166. In some examples, the IMU sensor(s) 1166 and the GNSS sensor(s) 1158 may be combined in a single integrated unit.

The vehicle may include microphone(s) 1196 placed in and/or around the vehicle 1100. The microphone(s) 1196 may be used for emergency vehicle detection and identification, among other things.

The vehicle may further include any number of camera types, including stereo camera(s) 1168, wide-view camera(s) 1170, infrared camera(s) 1172, surround camera(s) 1174, long-range and/or mid-range camera(s) 1198, and/or other camera types. The cameras may be used to capture image data around an entire periphery of the vehicle 1100. The types of cameras used depends on the embodiments and requirements for the vehicle 1100, and any combination of camera types may be used to provide the necessary coverage around the vehicle 1100. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 11A and FIG. 11B.

The vehicle 1100 may further include vibration sensor(s) 1142. The vibration sensor(s) 1142 may measure vibrations of components of the vehicle, such as the axle(s). For example, changes in vibrations may indicate a change in road surfaces. In another example, when two or more vibration sensors 1142 are used, the differences between the vibrations may be used to determine friction or slippage of the road surface (e.g., when the difference in vibration is between a power-driven axle and a freely rotating axle).

The vehicle 1100 may include an ADAS system 1138. The ADAS system 1138 may include a SoC, in some examples. The ADAS system 1138 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1160, LIDAR sensor(s) 1164, and/or a camera(s). The ACC systems may include longitudinal ACC and/or lateral ACC. Longitudinal ACC monitors and controls the distance to the vehicle immediately ahead of the vehicle 1100 and automatically adjust the vehicle speed to maintain a safe distance from vehicles ahead. Lateral ACC performs distance keeping, and advises the vehicle 1100 to change lanes when necessary. Lateral ACC is related to other ADAS applications such as LCA and CWS.

CACC uses information from other vehicles that may be received via the network interface 1124 and/or the wireless antenna(s) 1126 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1100), while the I2V communication concept provides information about traffic further ahead. CACC systems may include either or both I2V and V2V information sources. Given the information of the vehicles ahead of the vehicle 1100, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1160, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1160, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1100 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1100 if the vehicle 1100 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1160, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1100 is backing up. Some RCTW systems include AEB to ensure that the vehicle brakes are applied to avoid a crash. RCTW systems may use one or more rear-facing RADAR sensor(s) 1160, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1100, the vehicle 1100 itself must, in the case of conflicting results, decide whether to heed the result from a primary computer or a secondary computer (e.g., a first controller 1136 or a second controller 1136). For example, in some embodiments, the ADAS system 1138 may be a backup and/or secondary computer for providing perception information to a backup computer rationality module. The backup computer rationality monitor may run a redundant diverse software on hardware components to detect faults in perception and dynamic driving tasks. Outputs from the ADAS system 1138 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1104.

In other examples, ADAS system 1138 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1138 may be fed into the primary computer's perception block and/or the primary computer's dynamic driving task block. For example, if the ADAS system 1138 indicates a forward crash warning due to an object immediately ahead, the perception block may use this information when identifying objects. In other examples, the secondary computer may have its own neural network which is trained and thus reduces the risk of false positives, as described herein.

The vehicle 1100 may further include the infotainment SoC 1130 (e.g., an in-vehicle infotainment system (IVI)). Although illustrated and described as a SoC, the infotainment system may not be a SoC, and may include two or more discrete components. The infotainment SoC 1130 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1100. For example, the infotainment SoC 1130 may radios, disk players, navigation systems, video players, USB and Bluetooth connectivity, carputers, in-car entertainment, Wi-Fi, steering wheel audio controls, hands free voice control, a heads-up display (HUD), an HMI display 1134, a telematics device, a control panel (e.g., for controlling and/or interacting with various components, features, and/or systems), and/or other components. The infotainment SoC 1130 may further be used to provide information (e.g., visual and/or audible) to a user(s) of the vehicle, such as information from the ADAS system 1138, autonomous driving information such as planned vehicle maneuvers, trajectories, surrounding environment information (e.g., intersection information, vehicle information, road information, etc.), and/or other information.

The infotainment SoC 1130 may include GPU functionality. The infotainment SoC 1130 may communicate over the bus 1102 (e.g., CAN bus, Ethernet, etc.) with other devices, systems, and/or components of the vehicle 1100. In some examples, the infotainment SoC 1130 may be coupled to a supervisory MCU such that the GPU of the infotainment system may perform some self-driving functions in the event that the primary controller(s) 1136 (e.g., the primary and/or backup computers of the vehicle 1100) fail. In such an example, the infotainment SoC 1130 may put the vehicle 1100 into a chauffeur to safe stop mode, as described herein.

The vehicle 1100 may further include an instrument cluster 1132 (e.g., a digital dash, an electronic instrument cluster, a digital instrument panel, etc.). The instrument cluster 1132 may include a controller and/or supercomputer (e.g., a discrete controller or supercomputer). The instrument cluster 1132 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1130 and the instrument cluster 1132. In other words, the instrument cluster 1132 may be included as part of the infotainment SoC 1130, or vice versa.

Figure 11D:
FIG. 11D is a system diagram for communication between cloud-based server(s) and the example autonomous vehicle of FIG. 11A, in accordance with some embodiments of the present disclosure.

FIG. 11D is a system diagram for communication between cloud-based server(s) and the example autonomous vehicle 1100 of FIG. 11A, in accordance with some embodiments of the present disclosure. The system 1176 may include server(s) 1178, network(s) 1190, and vehicles, including the vehicle 1100. The server(s) 1178 may include a plurality of GPUs 1184(A)-1184 (H) (collectively referred to herein as GPUs 1184), PCIe switches 1182(A)-1182(H) (collectively referred to herein as PCIe switches 1182), and/or CPUs 1180(A)-1180(B) (collectively referred to herein as CPUs 1180). The GPUs 1184, the CPUs 1180, and the PCIe switches may be interconnected with high-speed interconnects such as, for example and without limitation, NVLink interfaces 1188 developed by NVIDIA and/or PCIe connections 1186. In some examples, the GPUs 1184 are connected via NVLink and/or NVSwitch SoC and the GPUs 1184 and the PCIe switches 1182 are connected via PCIe interconnects. Although eight GPUs 1184, two CPUs 1180, and two PCIe switches are illustrated, this is not intended to be limiting. Depending on the embodiment, each of the server(s) 1178 may include any number of GPUs 1184, CPUs 1180, and/or PCIe switches. For example, the server(s) 1178 may each include eight, sixteen, thirty-two, and/or more GPUs 1184.

The server(s) 1178 may receive, over the network(s) 1190 and from the vehicles, image data representative of images showing unexpected or changed road conditions, such as recently commenced road-work. The server(s) 1178 may transmit, over the network(s) 1190 and to the vehicles, neural networks 1192, updated neural networks 1192, and/or map information 1194, including information regarding traffic and road conditions. The updates to the map information 1194 may include updates for the HD map 1122, such as information regarding construction sites, potholes, detours, flooding, and/or other obstructions. In some examples, the neural networks 1192, the updated neural networks 1192, and/or the map information 1194 may have resulted from new training and/or experiences represented in data received from any number of vehicles in the environment, and/or based on training performed at a datacenter (e.g., using the server(s) 1178 and/or other servers).

The server(s) 1178 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1190, and/or the machine learning models may be used by the server(s) 1178 to remotely monitor the vehicles.

In some examples, the server(s) 1178 may receive data from the vehicles and apply the data to up-to-date real-time neural networks for real-time intelligent inferencing. The server(s) 1178 may include deep-learning supercomputers and/or dedicated AI computers powered by GPU(s) 1184, such as a DGX and DGX Station machines developed by NVIDIA. However, in some examples, the server(s) 1178 may include deep learning infrastructure that use only CPU-powered datacenters.

The deep-learning infrastructure of the server(s) 1178 may be capable of fast, real-time inferencing, and may use that capability to evaluate and verify the health of the processors, software, and/or associated hardware in the vehicle 1100. For example, the deep-learning infrastructure may receive periodic updates from the vehicle 1100, such as a sequence of images and/or objects that the vehicle 1100 has located in that sequence of images (e.g., via computer vision and/or other machine learning object classification techniques). The deep-learning infrastructure may run its own neural network to identify the objects and compare them with the objects identified by the vehicle 1100 and, if the results do not match and the infrastructure concludes that the AI in the vehicle 1100 is malfunctioning, the server(s) 1178 may transmit a signal to the vehicle 1100 instructing a fail-safe computer of the vehicle 1100 to assume control, notify the passengers, and complete a safe parking maneuver.

For inferencing, the server(s) 1178 may include the GPU(s) 1184 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 12:
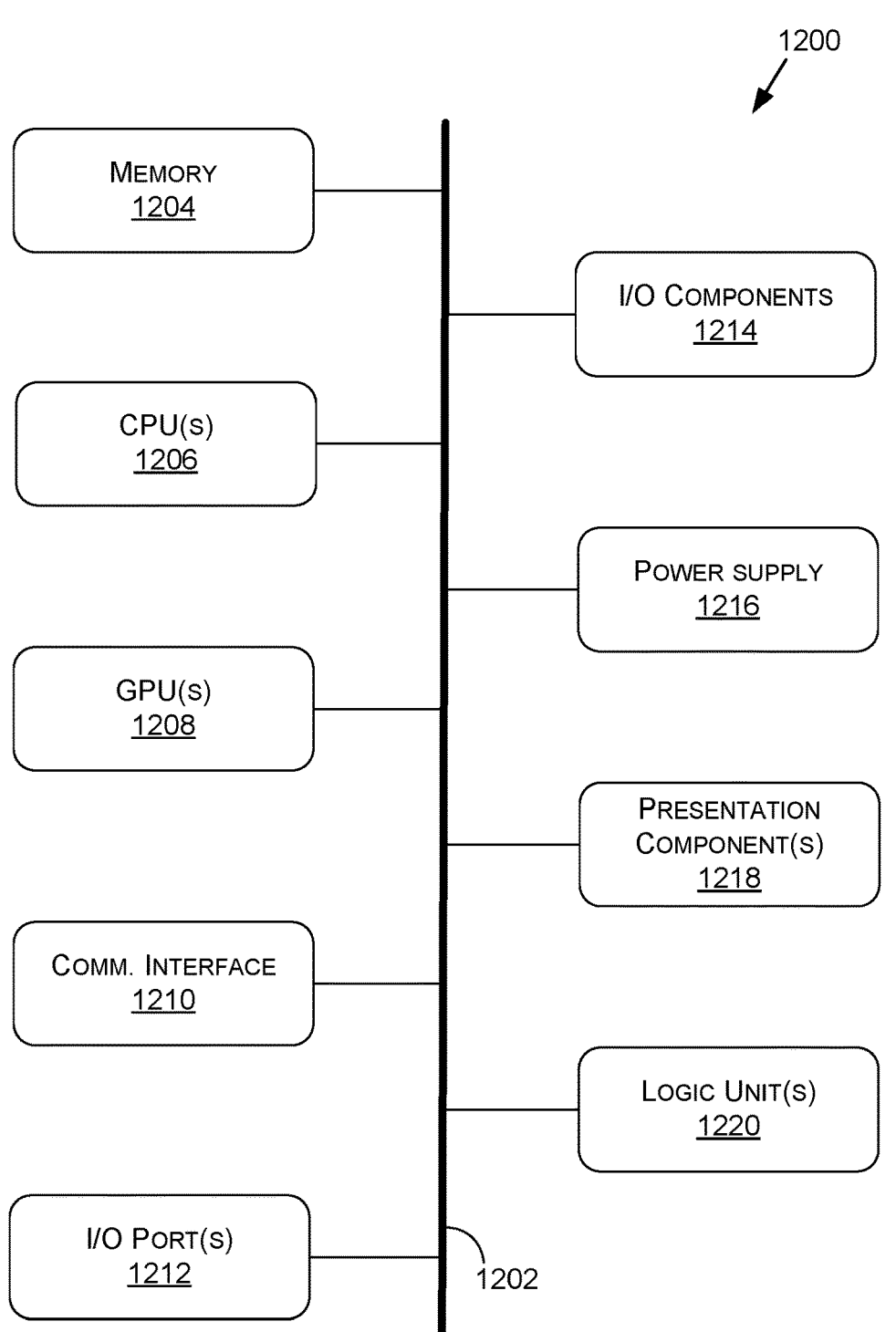
FIG. 12 is a block diagram of an example computing device suitable for use in implementing some embodiments of the present disclosure.

FIG. 12 is a block diagram of an example computing device(s) 1200 suitable for use in implementing some embodiments of the present disclosure. Computing device 1200 may include an interconnect system 1202 that directly or indirectly couples the following devices: memory 1204, one or more central processing units (CPUs) 1206, one or more graphics processing units (GPUs) 1208, a communication interface 1210, input/output (I/O) ports 1212, input/output components 1214, a power supply 1216, one or more presentation components 1218 (e.g., display(s)), and one or more logic units 1220. In at least one embodiment, the computing device(s) 1200 may comprise one or more virtual machines (VMs), and/or any of the components thereof may comprise virtual components (e.g., virtual hardware components). For non-limiting examples, one or more of the GPUs 1208 may comprise one or more vGPUs, one or more of the CPUs 1206 may comprise one or more vCPUs, and/or one or more of the logic units 1220 may comprise one or more virtual logic units. As such, a computing device(s) 1200 may include discrete components (e.g., a full GPU dedicated to the computing device 1200), virtual components (e.g., a portion of a GPU dedicated to the computing device 1200), or a combination thereof.

Although the various blocks of FIG. 12 are shown as connected via the interconnect system 1202 with lines, this is not intended to be limiting and is for clarity only. For example, in some embodiments, a presentation component 1218, such as a display device, may be considered an I/O component 1214 (e.g., if the display is a touch screen). As another example, the CPUs 1206 and/or GPUs 1208 may include memory (e.g., the memory 1204 may be representative of a storage device in addition to the memory of the GPUs 1208, the CPUs 1206, and/or other components). In other words, the computing device of FIG. 12 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 12.

The interconnect system 1202 may represent one or more links or busses, such as an address bus, a data bus, a control bus, or a combination thereof. The interconnect system 1202 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1206 may be directly connected to the memory 1204. Further, the CPU 1206 may be directly connected to the GPU 1208. Where there is direct, or point-to-point connection between components, the interconnect system 1202 may include a PCIe link to carry out the connection. In these examples, a PCI bus need not be included in the computing device 1200.

The memory 1204 may include any of a variety of computer-readable media. The computer-readable media may be any available media that may be accessed by the computing device 1200. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1204 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1200. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1206 may be configured to execute at least some of the computer-readable instructions to control one or more components of the computing device 1200 to perform one or more of the methods and/or processes described herein. The CPU(s) 1206 may each include one or more cores (e.g., one, two, four, eight, twenty-eight, seventy-two, etc.) that are capable of handling a multitude of software threads simultaneously. The CPU(s) 1206 may include any type of processor, and may include different types of processors depending on the type of computing device 1200 implemented (e.g., processors with fewer cores for mobile devices and processors with more cores for servers). For example, depending on the type of computing device 1200, the processor may be an Advanced RISC Machines (ARM) processor implemented using Reduced Instruction Set Computing (RISC) or an x86 processor implemented using Complex Instruction Set Computing (CISC). The computing device 1200 may include one or more CPUs 1206 in addition to one or more microprocessors or supplementary co-processors, such as math co-processors.

In addition to or alternatively from the CPU(s) 1206, the GPU(s) 1208 may be configured to execute at least some of the computer-readable instructions to control one or more components of the computing device 1200 to perform one or more of the methods and/or processes described herein. One or more of the GPU(s) 1208 may be an integrated GPU (e.g., with one or more of the CPU(s) 1206 and/or one or more of the GPU(s) 1208 may be a discrete GPU. In embodiments, one or more of the GPU(s) 1208 may be a coprocessor of one or more of the CPU(s) 1206. The GPU(s) 1208 may be used by the computing device 1200 to render graphics (e.g., 3D graphics) or perform general purpose computations. For example, the GPU(s) 1208 may be used for General-Purpose computing on GPUs (GPGPU). The GPU(s) 1208 may include hundreds or thousands of cores that are capable of handling hundreds or thousands of software threads simultaneously. The GPU(s) 1208 may generate pixel data for output images in response to rendering commands (e.g., rendering commands from the CPU(s) 1206 received via a host interface). The GPU(s) 1208 may include graphics memory, such as display memory, for storing pixel data or any other suitable data, such as GPGPU data. The display memory may be included as part of the memory 1204. The GPU(s) 1208 may include two or more GPUs operating in parallel (e.g., via a link). The link may directly connect the GPUs (e.g., using NVLINK) or may connect the GPUs through a switch (e.g., using NVSwitch). When combined together, each GPU 1208 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1206 and/or the GPU(s) 1208, the logic unit(s) 1220 may be configured to execute at least some of the computer-readable instructions to control one or more components of the computing device 1200 to perform one or more of the methods and/or processes described herein. In embodiments, the CPU(s) 1206, the GPU(s) 1208, and/or the logic unit(s) 1220 may discretely or jointly perform any combination of the methods, processes and/or portions thereof. One or more of the logic units 1220 may be part of and/or integrated in one or more of the CPU(s) 1206 and/or the GPU(s) 1208 and/or one or more of the logic units 1220 may be discrete components or otherwise external to the CPU(s) 1206 and/or the GPU(s) 1208. In embodiments, one or more of the logic units 1220 may be a coprocessor of one or more of the CPU(s) 1206 and/or one or more of the GPU(s) 1208.

Examples of the logic unit(s) 1220 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Trec Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1210 may include one or more receivers, transmitters, and/or transceivers that enable the computing device 1200 to communicate with other computing devices via an electronic communication network, included wired and/or wireless communications. The communication interface 1210 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1220 and/or communication interface 1210 may include one or more data processing units (DPUs) to transmit data received over a network and/or through interconnect system 1202 directly to (e.g., a memory of) one or more GPU(s) 1208.

The I/O ports 1212 may enable the computing device 1200 to be logically coupled to other devices including the I/O components 1214, the presentation component(s) 1218, and/or other components, some of which may be built in to (e.g., integrated in) the computing device 1200. Illustrative I/O components 1214 include a microphone, mouse, keyboard, joystick, game pad, game controller, satellite dish, scanner, printer, wireless device, etc. The I/O components 1214 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1200. The computing device 1200 may be include depth cameras, such as stereoscopic camera systems, infrared camera systems, RGB camera systems, touchscreen technology, and combinations of these, for gesture detection and recognition. Additionally, the computing device 1200 may include accelerometers or gyroscopes (e.g., as part of an inertia measurement unit (IMU)) that enable detection of motion. In some examples, the output of the accelerometers or gyroscopes may be used by the computing device 1200 to render immersive augmented reality or virtual reality.

The power supply 1216 may include a hard-wired power supply, a battery power supply, or a combination thereof. The power supply 1216 may provide power to the computing device 1200 to enable the components of the computing device 1200 to operate.

The presentation component(s) 1218 may include a display (e.g., a monitor, a touch screen, a television screen, a heads-up-display (HUD), other display types, or a combination thereof), speakers, and/or other presentation components. The presentation component(s) 1218 may receive data from other components (e.g., the GPU(s) 1208, the CPU(s) 1206, DPUs, etc.), and output the data (e.g., as an image, video, sound, etc.).

Example Data Center

Figure 13:
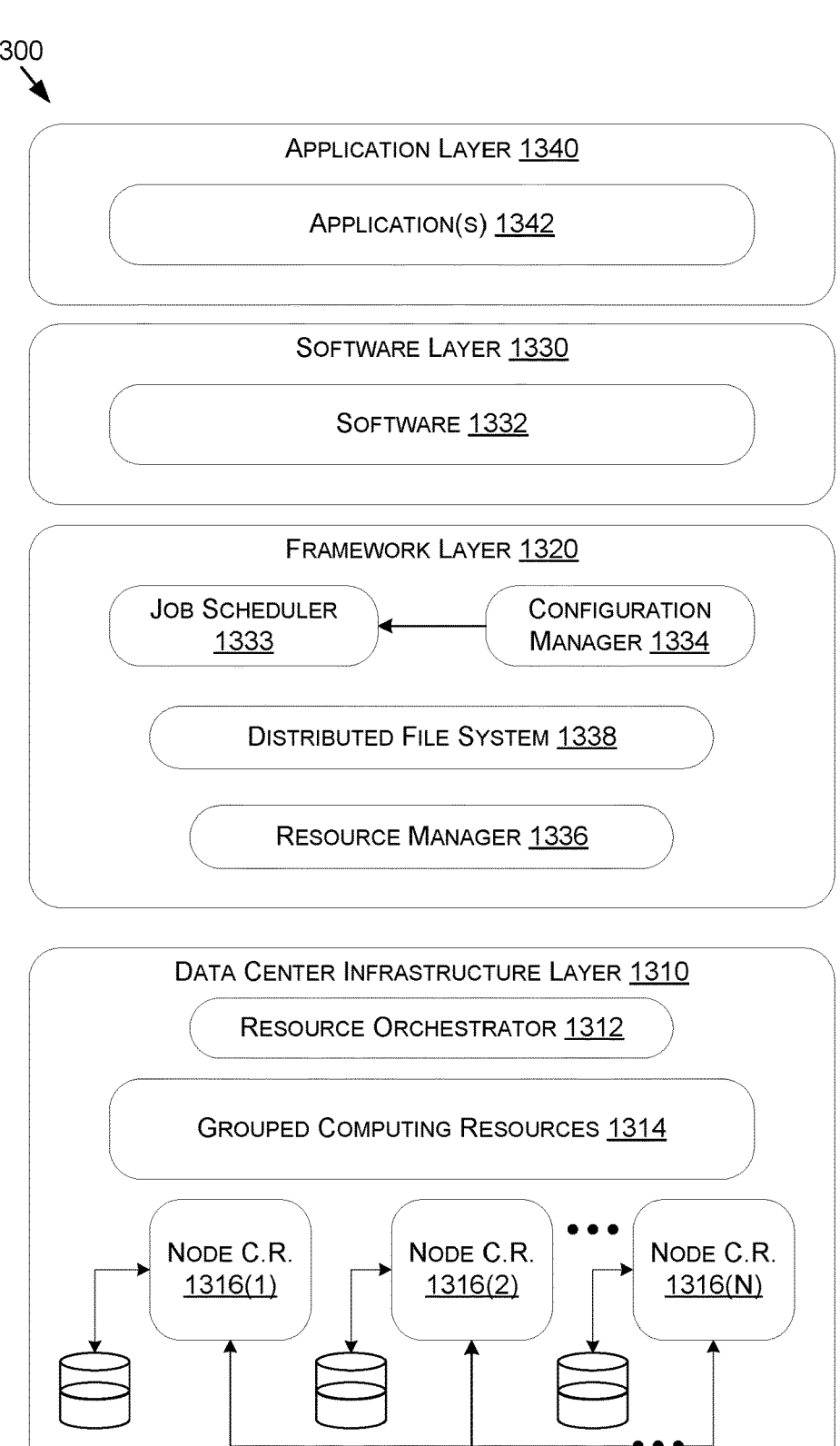
FIG. 13 is a block diagram of an example data center suitable for use in implementing some embodiments of the present disclosure.

FIG. 13 illustrates an example data center 1300 that may be used in at least one embodiments of the present disclosure. The data center 1300 may include a data center infrastructure layer 1310, a framework layer 1320, a software layer 1330, and/or an application layer 1340.

As shown in FIG. 13, the data center infrastructure layer 1310 may include a resource orchestrator 1312, grouped computing resources 1314, and node computing resources ("node C.R.s") 1316(1)-1316(N), where "N" represents any whole, positive integer. In at least one embodiment, node C.R.s 1316(1)-1316(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1316(1)-1316(N) may correspond to a server having one or more of the above-mentioned computing resources. In addition, in some embodiments, the node C.R.s 1316(1)-13161(N) may include one or more virtual components, such as vGPUs, vCPUs, and/or the like, and/or one or more of the node C.R.s 1316(1)-1316(N) may correspond to a virtual machine (VM).

In at least one embodiment, grouped computing resources 1314 may include separate groupings of node C.R.s 1316 housed within one or more racks (not shown), or many racks housed in data centers at various geographical locations (also not shown). Separate groupings of node C.R.s 1316 within grouped computing resources 1314 may include grouped compute, network, memory or storage resources that may be configured or allocated to support one or more workloads. In at least one embodiment, several node C.R.s 1316 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1312 may configure or otherwise control one or more node C.R.s 1316(1)-1316(N) and/or grouped computing resources 1314. In at least one embodiment, resource orchestrator 1312 may include a software design infrastructure (SDI) management entity for the data center 1300. The resource orchestrator 1312 may include hardware, software, or some combination thereof.

In at least one embodiment, as shown in FIG. 13, framework layer 1320 may include a job scheduler 1333, a configuration manager 1334, a resource manager 1336, and/or a distributed file system 1338. The framework layer 1320 may include a framework to support software 1332 of software layer 1330 and/or one or more application(s) 1342 of application layer 1340. The software 1332 or application(s) 1342 may respectively include web-based service software or applications, such as those provided by Amazon Web Services, Google Cloud and Microsoft Azure. The framework layer 1320 may be, but is not limited to, a type of free and open-source software web application framework such as Apache Spark™ (hereinafter "Spark") that may utilize distributed file system 1338 for large-scale data processing (e.g., "big data"). In at least one embodiment, job scheduler 1333 may include a Spark driver to facilitate scheduling of workloads supported by various layers of data center 1300. The configuration manager 1334 may be capable of configuring different layers such as software layer 1330 and framework layer 1320 including Spark and distributed file system 1338 for supporting large-scale data processing. The resource manager 1336 may be capable of managing clustered or grouped computing resources mapped to or allocated for support of distributed file system 1338 and job scheduler 1333. In at least one embodiment, clustered or grouped computing resources may include grouped computing resource 1314 at data center infrastructure layer 1310. The resource manager 1336 may coordinate with resource orchestrator 1312 to manage these mapped or allocated computing resources.

In at least one embodiment, software 1332 included in software layer 1330 may include software used by at least portions of node C.R.s 1316(1)-1316(N), grouped computing resources 1314, and/or distributed file system 1338 of framework layer 1320. One or more types of software may include, but are not limited to, Internet web page search software, e-mail virus scan software, database software, and streaming video content software.

In at least one embodiment, application(s) 1342 included in application layer 1340 may include one or more types of applications used by at least portions of node C.R.s 1316 (1)-1316(N), grouped computing resources 1314, and/or distributed file system 1338 of framework layer 1320. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1334, resource manager 1336, and resource orchestrator 1312 may implement any number and type of self-modifying actions based on any amount and type of data acquired in any technically feasible fashion. Self-modifying actions may relieve a data center operator of data center 1300 from making possibly bad configuration decisions and possibly avoiding underutilized and/or poor performing portions of a data center.

The data center 1300 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1300. In at least one embodiment, trained or deployed machine learning models corresponding to one or more neural networks may be used to infer or predict information using resources described above with respect to the data center 1300 by using weight parameters calculated through one or more training techniques, such as but not limited to those described herein.

In at least one embodiment, the data center 1300 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1200 of FIG. 12—e.g., each device may include similar components, features, and/or functionality of the computing device(s) 1200. In addition, where backend devices (e.g., servers, NAS, etc.) are implemented, the backend devices may be included as part of a data center 1300, an example of which is described in more detail herein with respect to FIG. 13.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1200 described herein with respect to FIG. 12. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

EXAMPLE PARAGRAPHS

A: A method comprising: determining, based at least on first sensor data generated using a first sensor of a machine, that a part of the machine is occluding an area of an environment; determining, based at least on at least one of the first sensor data or second sensor data generated using a second sensor of the machine, whether an object may be located within the area of the environment; and causing, based at least on whether the object may be located within the area of the environment, the machine to perform one or more operations.

B: The method of paragraph A, wherein the determining that the part of the machine is occluding the area of the environment comprises determining, using one or more machine learning models and based at least on the first sensor data, the area of the environment that is occluded by the part of the machine.

C: The method of paragraph A or paragraph B, wherein the determining that the part of the machine is occluding the area of the environment comprises: determining, based at least on the first sensor data representative of a sensor representation, that a portion of the sensor representation is occluded by the object; and determining, based at least on the portion of the sensor representation, the area of the environment.

D: The method of any one of paragraphs A-C, wherein the determining that the part of the machine is occluding the area of the environment comprises: determining, based at least on the first sensor data, a pose associated with the part of the machine; and determining, based at least on the pose, the area of the environment.

E: The method of any one of paragraphs A-D, wherein the determining whether the object is located within the area of the environment comprises: determining, based at least on the at least one of the first sensor data or the second sensor data, information associated with the object; and determining, based at least on the information, whether the object is located within the area of the environment.

F: The method of paragraph E, wherein the information comprises one or more of: an initial location associated with the object; a direction of travel associated with the object; a velocity associated with the object; or a classification associated with the object.

G: The method of any one of paragraphs A-F, further comprising: determining one or more trajectories associated with navigating the machine from a first location to a second location; determining one or more areas of the environment that may be occluded based at least on the machine navigating the one or more trajectories; and selecting a trajectory of the one or more trajectories that is associated with a minimum area of the one or more areas, wherein the area is associated with the minimum area.

H: The method of any one of paragraphs A-G, wherein the causing the machine to perform the one or more operations comprises one or more of: causing the part of the machine to move in order to reduce the area of the environment that is occluded; causing the machine to navigate along a current trajectory based at least on the object being located outside of the area of the environment; or causing the machine to at least one of stop or navigate along a new trajectory based at least on the object being located within the area of the environment.

I: The method of any one of paragraphs A-H, further comprising: determining, based at least on third sensor data generated using the first sensor, that the object is no longer located within the area of the environment; and causing, based at least on the object no longer being located within the area of the environment, the machine to perform one or more second operations.

J: The method of any one of paragraphs A-I, wherein the determining the area occurs when the part is in a first pose, and wherein the method further comprises: causing the part to change from the first pose to a second pose; determining, based at least on the part being within the second pose, that the part of the machine is occluding a second area of the environment that is less than the area of the environment; and verifying whether the object may be located within the area of the environment.

K: A system comprising: one or more processing units to: determine, based at least on first sensor data generated using a first sensor of a machine, that a part of the machine is occluding an area of an environment; determine, based at least on at least one of the first sensor data or second sensor data generated using a second sensor of the machine, whether an object may be located within the area of the environment; and cause, based at least on whether the object may be located within the area of the environment, the machine to perform one or more operations.

L: The system of paragraph K, wherein the determination that the part of the machine is occluding the area of the environment comprises determining, using one or more machine learning models and based at least on the first sensor data, the area of the environment that is occluded by the part of the machine.

M: The systems of paragraph K or paragraph L, wherein the determination that the part of the machine is occluding the area of the environment comprises: determining, based at least on the first sensor data representative of a sensor representation, that a portion of the sensor representation is occluded by the object; and determining, based at least on the portion of the sensor representation, the area of the environment.

N: The system of any one of paragraphs K-M, wherein the determination that the part of the machine is occluding the area of the environment comprises: determining a pose associated with the part of the machine; and determining, based at least on the pose, the area of the environment.

O: The system of any one of paragraphs K-N, wherein the determination of whether the object is located within the area of the environment comprises: determining, based at least on the at least one of the first sensor data or the second sensor data, information associated with the object; and determining, based at least on the information, whether the object is located within the area of the environment.

P: The system of any one of paragraphs K-O, wherein the one or more processing units are further to: determine one or more trajectories associated with navigating the machine from a first location to a second location; determine one or more areas of the environment that may be occluded based at least on the machine navigating the one or more trajectories; and select a trajectory of the one or more trajectories that is associated with a minimum area of the one or more areas, wherein the area is associated with the minimum area.

Q: The system of any one of paragraphs K-P, wherein the causation of the machine to perform the one or more operations comprises one or more of: causing the part of the machine to move in order to reduce the area of the environment that is occluded; causing the machine to navigate along a current trajectory based at least on the object being located outside of the area of the environment; or causing the machine to at least one of stop or navigate along a new trajectory based at least on the object being located within the area of the environment.

R: The system of any one of paragraphs K-Q, wherein the system is comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system implemented using a robot; a system for performing one or more generative AI operations; a system for performing operations using a large language model; a system for performing one or more conversational AI operations; a system for generating synthetic data; a system for presenting at least one of virtual reality content, augmented reality content, or mixed reality content; a system incorporating one or more virtual machines (VMs); a system implemented at least partially in a data center; or a system implemented at least partially using cloud computing resources.

S: A processor comprising: one or more processing units to cause a machine to perform one or more operations based at least on whether an object is located within an occluded area of an environment, wherein the occluded area of the environment is determined based at least on determining that a portion of a sensor representation represented by sensor data is occluded by a part of the machine.

T: The processor of paragraph S, wherein the processor is comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system implemented using a robot; a system for performing one or more generative AI operations; a system for performing operations using a large language model; a system for performing one or more conversational AI operations; a system for generating synthetic data; a system for presenting at least one of virtual reality content, augmented reality content, or mixed reality content; a system incorporating one or more virtual machines (VMs); a system implemented at least partially in a data center; or a system implemented at least partially using cloud computing resources.

What is claimed is:

1. One or more processors comprising processing circuitry to:

determine that a wheel occludes a first area of an environment from one or more sensors of a machine when the wheel is in a first pose to navigate the machine along a first trajectory associated with navigating a machine from a first location within the environment to a second location within the environment;

determine that the wheel occludes a second area of the environment from the one or more sensors when the wheel is in a second pose to navigate the machine along a second trajectory associated with navigating the machine from the first location within the environment to the second location within the environment, the second pose of the wheel being different than the first pose of the wheel;

select, based at least on the first area being less than the second area, to navigate along the first trajectory; and cause the machine to navigate along the first trajectory.

2. The one or more processors of claim 1, wherein the one or more processors are comprised in at least one of:

a control system for an autonomous or semi-autonomous machine;

a perception system for an autonomous or semi-autonomous machine;

a system for performing one or more simulation operations;

a system for performing one or more digital twin operations;

a system for performing light transport simulation;

a system for performing collaborative content creation for 3D assets;

a system for performing one or more deep learning operations;

a system implemented using an edge device;

a system implemented using a robot;

a system for performing one or more generative AI operations;

a system for performing operations using a large language model;

a system for performing one or more conversational AI operations;

a system for generating synthetic data;

a system for presenting at least one of virtual reality content, augmented reality content, or mixed reality content;

a system incorporating one or more virtual machines (VMs);

a system implemented at least partially in a data center; or a system implemented at least partially using cloud computing resources.

3. The one or more processors of claim 1, wherein the processing circuitry is further to:

determine, based at least on sensor data obtained using the one or more sensors, whether an object is located within the first area of the environment, wherein the first trajectory is further selected based at least on whether the object is located along the first trajectory.

4. The one or more processors of claim 3, wherein the determination of whether the object is located within the first area of the environment comprises:

determining, based at least on the sensor data, information associated with the object; and determining, based at least on the information, whether the object is located within the first area of the environment.

5. The one or more processors of claim 4, wherein the information comprises one or more of:

an initial location associated with the object;

a direction of travel associated with the object;

a velocity associated with the object; or a classification associated with the object.

6. The one or more processors of claim 1, wherein the processing circuitry is further to:

determine, based at least on sensor data obtained using the one or more sensors, that an object is located within the second area of the environment, wherein the first trajectory is further selected based at least on the object being located within the second area of the environment.

7. The one or more processors of claim 1, wherein at least one of:

the determination that the wheel occludes the first area of the environment when the wheel is in the first pose is based at least on one or more neural networks processing sensor data obtained using the one or more sensors; or the determination that the wheel occludes the second area of the environment when the wheel is in the second pose is based at least on one or more neural networks processing the sensor data obtained using the one or more sensors.

8. The one or more processors of claim 1, wherein at least a sensor of the one or more sensors is oriented on the machine at least partially towards the wheel.

9. A method comprising:

determining that a wheel occludes a first area of an environment from one or more sensors of a machine when the wheel is in a first pose to navigate the machine along a first trajectory from a first location within the environment to a second location within the environment;

determining that the wheel occludes a second area of the environment from the one or more sensors when the wheel is in a second pose to navigate the machine along a second trajectory from the first location within the environment to the second location within the environment, the second pose of the wheel being different than the first pose of the wheel;

selecting, based at least on the first area being less than the second area, to navigate along the first trajectory; and causing the machine to navigate along the first trajectory.

10. The method of claim 9, further comprising:

determining, based at least on sensor data obtained using the one or more sensors, whether an object is located within the first area of the environment, wherein the selecting the first trajectory is further based at least on whether the object is located along the first trajectory.

11. The method of claim 10, wherein the determining whether the object is located within the first area of the environment comprises:

determining, based at least on the sensor data, information associated with the object; and determining, based at least on the information, whether the object is located within the first area of the environment.

12. The method of claim 11, wherein the information comprises one or more of:

an initial location associated with the object;

a direction of travel associated with the object;

a velocity associated with the object; or a classification associated with the object.

13. The method of claim 9, further comprising:

determining, based at least on sensor data obtained using the one or more sensors, that an object is located within the second area of the environment, wherein the selecting the first trajectory is further based at least on the object being located within the second area of the environment.

14. The method of claim 9, wherein at least one of:

the determining that the wheel occludes the first area of the environment when the wheel is in the first pose is based at least on one or more neural networks processing sensor data obtained using the one or more sensors; or the determining that the wheel occludes the second area when the wheel is in the second pose is based at least on one or more neural networks processing the sensor data obtained using the one or more sensors.

15. The method of claim 9, wherein at least a sensor of the one or more sensors is oriented on the machine at least partially towards the wheel.

16. A system comprising:

one or more processors to:

determine that a wheel occludes a first area of an environment from one or more sensors of a machine when the wheel is in a first pose to cause the machine to navigate along a first trajectory from a first location within the environment to a second location within the environment;

determine that the wheel occludes a second area of the environment from the one or more sensors when the wheel is in a second pose to navigate the machine along a second trajectory from the first location within the environment to the second location within the environment, the second pose of the wheel being different than the first pose of the wheel;

select, based at least on the first area being less than the second area, to navigate along the first trajectory; and cause the machine to navigate along the first trajectory.

17. The system of claim 16, wherein the one or more processors are further to:

determine, based at least on sensor data obtained using the one or more sensors, whether an object is located within the first area of the environment, wherein the first trajectory is further selected based at least on whether the object is located along the first trajectory.

18. The system of claim 17, wherein the determination of whether the object is located within the first area of the environment comprises:

determining, based at least on the sensor data, information associated with the object; and determining, based at least on the information, whether the object is located within the first area of the environment.

19. The system of claim 16, wherein the one or more processors are further to:

determine, based at least on sensor data obtained using the one or more sensors, that an object is located within the second area of the environment, wherein the first trajectory is further selected based at least on the object being located within the second area of the environment.

20. The system of claim 16, wherein the system is comprised in at least one of:

a control system for an autonomous or semi-autonomous machine;

a perception system for an autonomous or semi-autonomous machine;

a system for performing one or more simulation operations;

a system for performing one or more digital twin operations;

a system for performing light transport simulation;

a system for performing collaborative content creation for 3D assets;

a system for performing one or more deep learning operations;

a system implemented using an edge device;

a system implemented using a robot;

a system for performing one or more generative AI operations;

a system for performing operations using a large language model;

a system for performing one or more conversational AI operations;

a system for generating synthetic data;

a system for presenting at least one of virtual reality content, augmented reality content, or mixed reality content;

a system incorporating one or more virtual machines (VMs);

a system implemented at least partially in a data center; or a system implemented at least partially using cloud computing resources.

\* \* \* \* \*